US011262310B2

(12) United States Patent
McMillan et al.

(10) Patent No.: US 11,262,310 B2
(45) Date of Patent: Mar. 1, 2022

(54) APPARATUS FOR ANALYZING THE OPTICAL PROPERTIES OF A SAMPLE

(71) Applicant: ADVANCED NANO TECHNOLOGIES LIMITED, Dubin (IE)

(72) Inventors: Norman McMillan, Carlow (IE); Martina O'Neill, Dublin (IE); Sven Riedel, Hamburg (DE); Liam McDonnell, Dublin (IE)

(73) Assignee: ADVANCED NANO TECHNOLOGIES LIMITED, Dublin (IE)

( * ) Notice: Subject to any disclaimer, the term of this patent is extended or adjusted under 35 U.S.C. 154(b) by 0 days.

(21) Appl. No.: 16/651,072

(22) PCT Filed: Sep. 27, 2018

(86) PCT No.: PCT/EP2018/076370
§ 371 (c)(1),
(2) Date: Mar. 26, 2020

(87) PCT Pub. No.: WO2019/063745
PCT Pub. Date: Apr. 4, 2019

(65) Prior Publication Data
US 2020/0232922 A1 Jul. 23, 2020

(30) Foreign Application Priority Data

Sep. 27, 2017 (EP) .................................. 17193604
Sep. 27, 2017 (GB) .................................... 1715670

(51) Int. Cl.
*G01N 21/65* (2006.01)

(52) U.S. Cl.
CPC ..... *G01N 21/658* (2013.01); *G01N 2201/023* (2013.01); *G01N 2201/0224* (2013.01);
(Continued)

(58) Field of Classification Search
CPC ............ G01N 21/658; G01N 21/0303; G01N 2201/023; G01N 2201/10; G01N 2021/035
See application file for complete search history.

(56) References Cited

U.S. PATENT DOCUMENTS

| 6,809,826 B2 * | 10/2004 | Robertson .............. B82Y 15/00 356/246 |
| 7,397,036 B2 * | 7/2008 | Robertson ............ G01N 21/645 250/368 |

(Continued)

OTHER PUBLICATIONS

International Search Report and Written Opinion dated Jan. 16, 2019 from corresponding PCT Application No. PCT/EP2018/076370.

*Primary Examiner* — Maurice C Smith
(74) *Attorney, Agent, or Firm* — Honigman LLP

(57) ABSTRACT

An apparatus for analyzing optical properties of a sample includes a housing to receive a light source and a detector; a sample locus defined relative to the housing and positioned such that when a light source and a detector are in predetermined positions, the sample locus is subject to illumination by the light source and the detector is positioned to receive and detect light from the sample; a cover on the housing, the cover being movable in a hinged manner between an open position and a closed position; and a sample-receiving surface for receiving a free-standing sample in liquid or semi-solid form. When the cover is moved to the closed position it encloses the sample locus, with the sample-receiving surface being tilted away from horizontal during the closing movement and the sample being retained thereon by surface tension or adhesion and brought to the sample locus in an enclosed environment.

23 Claims, 16 Drawing Sheets

(52) U.S. Cl.
    CPC ........... *G01N 2201/0826* (2013.01); *G01N 2201/0833* (2013.01); *G01N 2201/10* (2013.01)

(56) References Cited

U.S. PATENT DOCUMENTS

| | | | | |
|---|---|---|---|---|
| 7,623,225 | B2 * | 11/2009 | Robertson, Jr. | G01J 3/02 356/213 |
| 8,189,199 | B2 * | 5/2012 | Robertson, Jr. | G01N 33/1806 356/440 |
| 8,208,145 | B2 * | 6/2012 | Large | G01N 21/31 356/436 |
| 8,223,338 | B2 * | 7/2012 | Robertson, Jr. | G01N 21/0303 356/440 |
| D739,771 | S * | 9/2015 | Jablonski | G01J 3/0291 D10/81 |
| 9,151,671 | B2 * | 10/2015 | Coffin | G01N 21/0303 |
| 9,778,185 | B2 * | 10/2017 | Chen | G01N 21/27 |
| 2009/0103077 | A1 | 4/2009 | Robertson, Jr. et al. | |
| 2009/0290153 | A1 * | 11/2009 | Juhl | G01N 21/0303 356/319 |
| 2014/0085628 | A1 | 3/2014 | McMillan et al. | |
| 2015/0309008 | A1 * | 10/2015 | Adelman | G01N 21/25 356/72 |
| 2017/0216836 | A1 | 8/2017 | Harnack et al. | |

\* cited by examiner

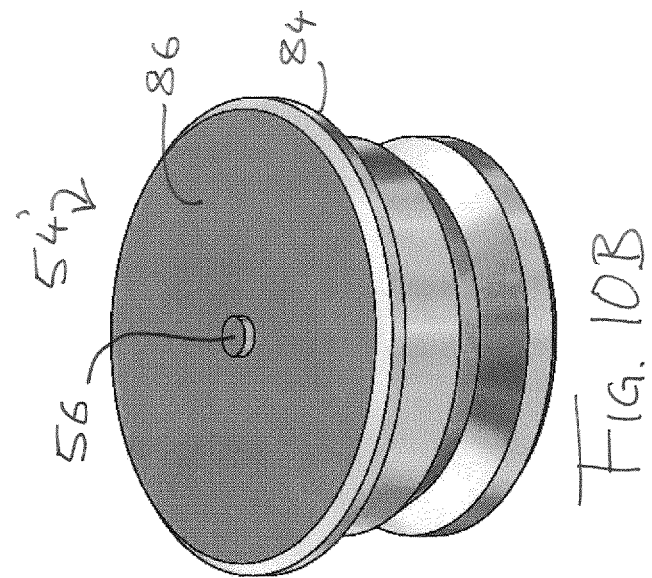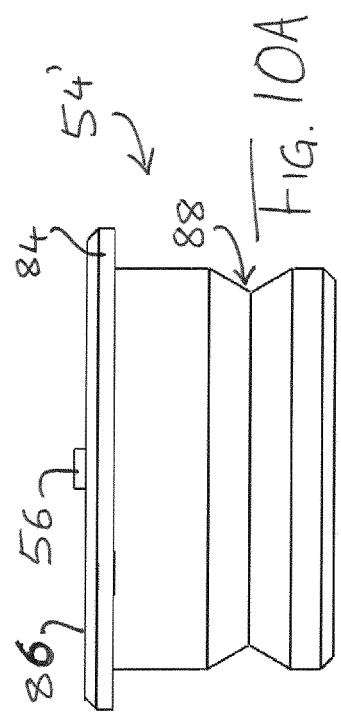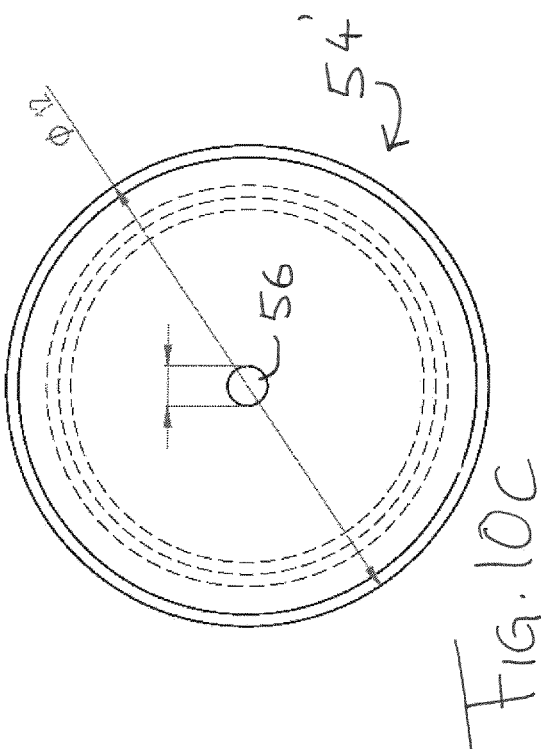

APPARATUS FOR ANALYZING THE OPTICAL PROPERTIES OF A SAMPLE

CROSS REFERENCE TO RELATED APPLICATIONS

The present application is a national stage patent application of PCT/EP2018/076370, filed Sep. 27, 2018, which claims the filing benefits of European patent application No. 17193604.0, filed Sep. 27, 2017, and Great Britain patent application No. 1715670.4, filed Sep. 27, 2017.

FIELD OF THE INVENTION

The present invention relates apparatuses for analysing the optical properties of a sample.

BACKGROUND OF THE INVENTION

The analysis of optical properties of samples using spectroscopic methods is well known. Traditionally samples have been held in quartz glass cuvettes to standardise the sample volume through which radiation passes, simplifying and standardising calculations.

More recently, the field of drop spectroscopy has come into prominence, allowing the spectroscopic measurement of microliter-scale volumes in liquid droplets. Due to the small volumes involved, which have high surface areas relative to the liquid volume, it is important to isolate the droplet quickly and reliably from the atmosphere. It is also important to optically isolate the sample, i.e. to enclose it in a dark volume to avoid stray light and other radiation from interfering with measurements. At the same time, the very small volumes involved make handling of the samples problematic, i.e. loading and unloading the droplets from the measurement position.

WO 2012/140232 describes an instrument useful in such measurements, having a housing containing drop-supporting surface (or plinth) for receiving a droplet of liquid. A cover is mounted on the housing, and this receives a light source and provides communication between the light source and the inner surface of the cover, allowing measurements to be made on the droplet. The cover can be rotated to bring the light source into position over the plinth, or to reveal the plinth through an aperture for loading and removing samples, with the cover both rotating and raising/lowering as it moves between positions to allow access to the interior plinth on the one hand, and to seal the volume containing the sample as well as bringing the measurement source into position on the other hand. While this instrument addresses the problems associated with drop spectroscopy using this cover, it relies on a relatively complicated mechanism, and the necessity of installing the light source (or detector) in the cover imposes constraints on the kinds of spectroscope that it can be used with. It would be advantageous to provide an instrument that is compatible with third party spectroscopes while taking account of the particular challenges associated with handling and measuring small droplets spectroscopically.

SUMMARY OF THE INVENTION

In accordance with one aspect of the invention there is provided an apparatus for analysing the optical properties of a sample, comprising:
 a housing to receive a light source and a detector in predetermined positions;
 a sample locus defined relative to said housing and positioned such that when a light source and a detector are in said predetermined positions, the sample locus is subject to illumination by said light source and the detector is positioned to receive and detect light from the sample;
 a cover on the housing, the cover being movable in a hinged manner between an open position and a closed position, the cover having an internal face which encloses the sample locus when the cover is in the closed position;
 a sample-receiving surface for receiving a free-standing sample in liquid or semi-solid form, the sample-receiving surface being disposed on the internal face of the cover such that when the cover is in said open position the sample-receiving surface is exposed to and accessible by a user in a generally horizontal orientation for loading of a sample thereon;
 wherein when the cover is moved to said closed position it encloses said sample locus, with the sample-receiving surface being tilted away from the horizontal during said closing movement and the sample being retained thereon by surface tension or adhesion and brought to said sample locus in an enclosed environment.

As used herein, a "light source" is a source of any suitable electromagnetic radiation, including visible, ultraviolet and infrared light. The light source may be an optical port, window or fibre end that connects to a source externally of the housing or one that is located somewhere else within the housing, and the detector may similarly be a detector port, window or fibre that feeds an external detector. The predetermined positions of the source and detector may be distinct or the same position (such as when a fiber end is the interface to the source and detector and the light is combined and split appropriately from the remote source and to the detector.

The detector may be any suitable detector to receive and detect light following an interaction with the sample, including light of the same wavelength(s) as the source (for example due to reflection, refraction or scattering by the sample) and light which is of a different wavelength due to phenomena such as photoluminescence, fluorescence, Raman scattering, and surface enhanced Raman spectroscopy (SERS) including variants such as SLIPSERS. The light may be polarised to provide information on the orientation of molecules in single crystals and anisotropic materials, e.g. polarized Raman spectroscopy can provide detailed information as to the symmetry labels of vibrational modes.

The sample-receiving surface may be provided with nanoscale structures to permit the enhancement of the Raman signal, such as by treating the surface with suitable nanoparticles, and/or by providing a patterned surface with nanoscale structures that permit the generation of surface plasmon resonance.

One design employs reusable sample dropheads or plinths, which can be prepared for SERS or other analyses. For example a stainless steel plinth is inert and reusable, and can be coated with colloidal gold, or silver, or admixtures of gold and silver nanoparticles. After use, they can be cleaned and reused for future measurements. Nanoparticles may be spherical or special shapes such as stars and irregular pointed shapes are useful because sharp points cause strong plasmonic emissions from these points. Other useful nanoparticles incorporate cores and shells. Such nanoparticles can be pipetted onto the plinth and the colloidal aggregation produces clustering of the particles and thus create hotspots.

Another option is to employ gold-plated or silver-plated plinths or dropheads, such as polystyrene dropheads plated with gold.

Furthermore, commercially available SERS substrates can be used, such as the porous SERS membrane (SER-DM) available from iFyber of Ithaca, N.Y., USA, or the gold-plated glass slides available from St. Japan of Dusseldorf, Germany, or the p-SERS inkjet printed substrates available from Diagnostic anSERS, Inc. of Laramie, Wyo., USA or Metrohm AG of Herisau, Switzerland, or the nanostructured, gold coated copper substrates available from Flew Solutions of Brisbane, Australia. (SER-DM and p-SERS are trade marks of the respective companies.)

Further options for SERS substrates usable as the sample-receiving surface are to be found in the review article "Review of SERS Substrates for Chemical Sensing", Pamela A. Mosier-Boss, Nanomaterials (Basel). 2017 June; 7(6): 142; doi: 10.3390/nano7060142. The sample locus may be (and in preferred embodiments actually is) smaller than the typical sample size. In particular light from the source may be brought to a focus which is point-like or at least a small volume of high intensity. This means that the focal point may be positioned within and scanned relative to the sample volume or the area of the sample-receiving surface.

The apparatus of the invention provides a highly accessible sample-receiving surface externally of the enclosure which aids in the accurate loading of small droplets onto a small surface. Typical sample-receiving surfaces have a diameter in the range of a few millimetres, such as 0.5 to 5 mm, with 1 to 2 mm plinths being suitable for most applications. Such plinths can reliably hold volumes in the microliter range, e.g. a 2 mm plinth can support by Laplace pressure a 3 µl droplet. This reduces the likelihood of mishandling errors, contamination and sample loss. It further facilitates reliable and total removal of samples and cleaning of the sample-receiving surface following the measurement of one sample and in preparation for the loading of the next sample.

Samples in liquid form can be pipetted or otherwise deposited onto the sample receiving surface, and following measurement, the sample receiving surface can be wiped clean with a tissue. Alternatively, the sample-receiving surface may be part of a disposable, replaceable or reusable plinth or drophead which can be swapped out and replaced with a new or cleaned member.

The hinged motion of the cover permits it to be flipped into the closed position where it seals the enclosure and brings the sample into position for measurement. This mechanism greatly increases the design freedom of the designer of the apparatus, allowing the cover to be mounted on almost any surface of a housing of any shape. This in turn means that the housing can be designed to receive a diverse range of spectroscope assemblies, including a range of third party "boxes" such as are conventionally sold and incorporated in laboratory instruments. Since the sample is held in position by surface tension, it is immaterial that the final orientation of the sample-receiving surface may be e.g. vertical or (as in preferred embodiments) fully inverted.

The apparatus of the invention may be given additional versatility by permitting the removal of a sample-receiving surface (such as a quartz plinth provided on a support) and its replacement by an alternative sample-receiving surface, or even in some cases by the substitution of a conventional sample holder into the position normally occupied by the sample-receiving surface.

By enabling the sample-receiving surface to be swapped out, one can provide a range of plinths of different materials, sizes and properties.

The sample-receiving surface may also be swapped out to enable the insertion of a standard material providing a known spectroscopic response, such as a polystyrene which exhibits sharp spectroscopic peaks at well-known wavelengths, or silicon having a Raman line at 520.7 cm-1. These materials can be used in bulk form, as a coating on a carrier plinth, or without swapping out the sample-receiving surface they could be powdered and used in a liquid droplet.

Preferably, in this regard, the sample holder is located in use within a hole in the cover, and when the sample holder is removed, the hole can be accessed from the external cover surface to permit the insertion of an alternative sample holder from the rear side thereof.

This feature will be described further below in relation to a vial holder that is positioned externally of the cover and which can hold a vial that is exposed internally of the cover.

The sample holder may also be swapped out to be replaced with an optical connector to which an external probe could be attached. Such an external probe can allow the internal spectroscopic components to analyse a sample that is outside or remote from the housing, e.g. by transmitting the light e.g. laser light from the source, out through the optical connector that replaced the sample holder, and through an optical fiber which can be directed at the external sample. Light travels back to the detector the same route. Such an external probe may be provided with a cap or end member carrying an active coating such as is described in relation to FIG. 18.

Preferably, the sample-receiving surface is translated through at least 90 degrees as the cover moves from the open position to the closed position.

More preferably, the sample-receiving surface is translated through approximately 180 degrees as the cover moves from the open position to the closed position, with the sample-receiving surface being inverted when the cover is closed.

Preferably, the housing further comprises a support for receiving a spectroscopic assembly comprising a source and a detector mounted on a spectroscopic assembly housing, such that when said assembly is received by said support, the source and detector are in said predetermined positions.

In certain embodiments, the source may be coupled to an optical fiber terminating at a terminating surface through which the light is coupled from the source to the sample locus, the terminating surface being positioned such that when the cover is in a closed position, the sample is brought into contact with the terminating surface.

Additionally or alternatively, the detector may be coupled to an optical fiber terminating at a terminating surface through which the light is coupled from the sample locus to the detector, the terminating surface being positioned such that when the cover is in a closed position, the sample is brought into contact with the terminating surface.

Preferably, both the source and the detector are coupled to the same optical fiber having a single terminating surface which couples the light into and out of the sample.

Preferably, said terminating surface carries active material thereon which enhances a spectral response.

Further, preferably, the terminating surface is provided with a nanostructured treatment to realise a SERS response.

Preferably, the internal space comprises a sample chamber which is enclosed when the cover is in the closed position and which contains the sample locus, and an instrumentation chamber which receives the source and detector, the sample chamber being separated from the instrumentation chamber by an impermeable wall having a wall section which is transparent to a wavelength of radiation emitted by the source.

Further, preferably, the sample chamber is sealed when the cover is closed, and is sufficiently small in enclosed volume as to inhibit evaporation of a liquid sample droplet on said sample-receiving surface.

Further, preferably, the sample chamber comprises a reservoir for liquid whereby the enclosed volume becomes saturated with vapour from said liquid when said cover is closed.

Further, preferably, the sample chamber is provided with one or more additional environmental controls, such as a temperature control mechanism.

Preferably, a sensor detects when the cover reaches a predetermined position moving between the open and closed positions, the sensor being operatively connected to a control circuit which prevents the source from being activated while the cover is open.

The sensor is advantageously a microswitch which is triggered as the cover approaches or reaches the closed position. It may be positioned to ensure that the source remains inactive when the cover is opened beyond e.g. 5 degrees.

The apparatus preferably further comprises one or more motors operable to displace the sample-receiving surface, when the cover is in the closed position, relative to the source and detector, thereby permitting fine adjustment of the material carried on the sample-receiving surface relative to the sample locus.

In this way, an apparatus having a source whose light is focussed to a point or very small volume, can allow for fine tuning of the illumination relative to the sample. This has particular application in SERS applications, where the interaction of the sample with surface plasmons results in "hot spots", i.e. locations showing significantly enhanced response to the illumination.

Preferably, said one or more motors are operatively connected to a motor controller which is operable to scan the sample-receiving surface in a controlled manner relative to the sample locus.

Preferably, said one or more motors include first and second motors which are disposed to displace the sample-receiving surface in mutually orthogonal directions in the plane of the sample-receiving surface.

Further, preferably, said one or more motors include a third motor disposed to displace the sample-receiving surface in a direction normal to the plane of the sample-receiving surface.

The addition of a z-control permits the position of a focal point to be varied relative to the plane of the sample-receiving surface. This can be used in scanning the sample at points other than at the sample-receiving surface, e.g. the bulk volume, the exposed surface, or above the surface where vapours or gases may be given off. It also permits the apparatus to adjust for different sample heights or different refractive indices which would otherwise cause the sample to focus the source light away from the sample-receiving surface. As will be apparent from what follows, the z-control may be provided in the source optics or to translate the sample-receiving surface. The motor controller will preferably have control of such a z-direction motor in either case.

Suitably, the apparatus may comprise in addition to said one or more motors operable to displace the sample receiving surface, at least one additional motor operable to displace the source or an optical element through which the light travels from the source to the sample locus, wherein the additional motor is operable to translate a focus of light from the source in a direction normal to the plane of the sample-receiving surface.

Thus, for example, a pair of motors can displace the sample-receiving surface in the x- and y-directions, and an additional motor can displace the source to move the focal point of the incident light in the z-direction.

Thus, the motors can include x, y and z control (where x, y and x denote mutually orthogonal axes). This has particular advantages in permitting targeted analysis of any point on the sample-receiving surface itself, as well as of any point within the bulk of the sample, the surface of the sample, or above that surface (which may be useful in the detection of e.g. evaporating gases from a sample).

The motor controller can operate under manual control or it may be automated. The automation of the motor controller can be pre-programmed to follow a pre-determined scan pattern, or it can be intelligent, whereby an algorithm seeks out a signal maximum or signal minimum for example.

Preferably, the motor controller is under the control of a software program which conducts a pre-programmed coarse scan to identify potential target areas, and which then performs a fine scan near one or more signal maxima identified in the coarse scan, to locate a local maximum.

Alternatively, the motor controller may be under the control of a software program which conducts a three-dimensional scan through the volume of the sample, permitting the integration or aggregation of the detected signal from a plurality of locations within the volume of the sample.

The apparatus may additionally comprise an optical sensing system to identify the boundaries of the sample.

Preferably, the optical sensing system is provided as a camera positioned to image the sample.

A preferred camera is micro-camera with visible and IR sensitivities. IR capabilities are advantageous as such cameras are receptive to wavelengths typically used in Raman/SERS applications.

The motor controller may be programmed to perform a scan within the boundaries identified by the optical sensing system. Those boundaries can be two-dimensional or three-dimensional.

Thus, the camera may image the sample-receiving surface, and the motor controller (or associated software) may derive from the image a set of co-ordinates that define the limits of the sample-receiving surface. The scan can then be conducted within the boundaries identified by those co-ordinates across the sample-receiving surface.

If a z-control is provided permitting either the sample-receiving surface or the source (or source optics) to be translated in the z-direction normal to the sample-receiving surface, then the camera may image the sample volume and the motor controller (or associated software) may derive from the image a three-dimensional set of co-ordinates that define the limits of the sample volume. The scan can then be conducted within the boundaries of that sample volume.

Any suitable co-ordinate system can be used to define the scan area or scan volume, e.g. cartesian, polar, azimuthal, or a co-ordinate system defined in terms of motor steps for the individual motors.

The invention also provides a sample holder removal tool, the tool having a pair of jaws for gripping a sample holder body and providing clearance for a sample disposed on the sample holder body at a sample receiving surface.

The invention further provides an apparatus for analysing the optical properties of a sample, comprising:

a housing to receive a light source and a detector in predetermined positions;

a sample holder comprising a body having a sample-receiving surface for receiving a free-standing sample in liquid or semi-solid form, the sample-receiving surface being positionable relative to the source and detector to permit analysis of a sample thereon by said source and detector;

a receiving member, connected to the housing, for releasable receiving the sample holder;

wherein the sample holder is removable from the receiving member allowing its replacement by another sample holder.

Preferably, when the sample holder is received in said receiving member, a protrusion on the sample holder is accessible to grip the sample holder and permit its removal.

Further preferably, the sample holder body has an exposed rim which is proud of the receiving member when the sample holder is in place and which provides said protrusion.

In a further aspect there is provided an apparatus for analysing the optical properties of a sample, comprising:

a housing to receive a light source and a detector;

an environmental chamber body member in communication with the source and the detector, such that a sample located in a predetermined position relative to the environmental chamber body member is positioned to be illuminated with light from the source;

a carrier shaped to engage with the environmental chamber body member to provide an enclosed environmental chamber when the carrier and the environmental chamber body member are in predetermined positions;

a sample-receiving surface for receiving a free-standing sample in liquid or semi-solid form, the sample-receiving surface being disposed on said carrier;

wherein the carrier is rotatably mounted on the housing such that it can be rotated about an axis between a loading position and a measurement position, with the sample-receiving surface being exposed to a user when the carrier is in a loading position, and with the carrier being positioned for engagement with the environmental chamber body member when in the measurement position.

In certain embodiments, the carrier is a cover having a hinged connection to the housing, whereby the cover may be flipped about the hinged connection to move between the loading and measurement positions.

In other embodiments, the carrier is rotatable about an axis passing through the carrier to spin from the loading position to the measurement position about said axis.

Preferably, the environmental chamber body member is movable within the housing to engage with the carrier and provide an enclosed environmental chamber containing the sample-receiving surface when the carrier is in the measurement position.

Preferably, the environmental chamber body member is movable by translation from a first position to a second position, and when in the first position it is more distant from the carrier permitting the carrier to spin around said axis, and when in the second position it is engaged with the carrier preventing the carrier from moving.

Embodiments can be provided where the sample-receiving surface is translated into a measurement position without being rotated.

In another aspect there is provided a method of analysing a sample in the form of a droplet provided on a sample-receiving surface, the method comprising:

providing a light source and a detector in a housing;

positioning said sample-receiving surface in or on the housing;

focussing an incident beam of light to a focal point in the vicinity of the sample;

detecting light from the sample resulting from an interaction with the sample, the sample-receiving surface, or the atmosphere surrounding the sample;

measuring one or more parameters of the detected light;

translating the sample-receiving surface relative to the housing such that the focal point is at a different region of the sample, the sample-receiving surface, or the atmosphere surrounding the sample; and repeating the step of measuring one or more parameters of the detected light following said translating step.

Preferably, said steps of translating the sample-receiving surface and repeating the step of measuring the one or more parameters of the detected light are performed multiple times, to provide a plurality of measurements taken from different positions relative to the sample.

Further, preferably, the step of translating the sample comprises translating the sample in a plane parallel to the sample-receiving surface.

Further, preferably, the step of translating the sample comprises translating the sample in two dimensions such that a plurality of measurements are taken across said plane.

Further, preferably, the method further comprises the step of translating the sample-receiving surface in a direction normal to the sample-receiving surface and repeating a plurality of measurements in another plane located at a different distance from the sample-receiving surface.

Alternatively or additionally, the method may further comprise the step of translating the focal point in a direction normal to the sample-receiving surface and repeating a plurality of measurements in another plane located at a different distance from the sample-receiving surface without translating the sample-receiving surface in a direction normal thereto.

The method may comprise the step of analysing the plurality of measurements to determine an optimal measurement position.

Preferably, the method comprises the step of performing a fine scan by repeating the translation of the sample-receiving surface in the vicinity of said optimal measurement position to obtain an improved measurement position.

Preferably, the sample-receiving surface is provided with nanostructures enabling a SERS response, and the optimal measurement position provides a maximal SERS signal.

The method may comprise the step of analysing the plurality of measurements by aggregating or integrating said plurality of measurements.

The method may further comprise the steps of:

obtaining an image of the sample using an imaging device;

determining one or more sample boundaries from said image;

determining one or more translation limits within which the sample-receiving surface is to be translated to thereby enable said plurality of measurements to be taken from desired portions of the sample, the sample-receiving surface or the atmosphere surrounding the sample.

Optionally, the step of determining one or more translation limits further comprises determining limits within which the focal point is to be translated in a plane normal to the sample-receiving surface.

Preferably, the sample boundaries define a three-dimensional volume.

Preferably, the plurality of measurements are taken throughout the sample volume.

In a particularly preferred implementation, the plurality of measurements comprise a series of measurements taken in a plane parallel to the sample-receiving surface, repeated at additional parallel planes in a plurality of slices through the sample volume.

BRIEF DESCRIPTION OF THE DRAWINGS

The invention will now be further illustrated by the following description of embodiments thereof, given by way of example only with reference to the accompanying drawings, in which:

FIG. 10 is a detail of the assembly of FIG. 3 from which FIG. 8 is taken;

FIGS. 10A-10C are respectively a side elevation, a perspective view from above, and a top plan view of a sample holder;

DETAILED DESCRIPTION OF PREFERRED EMBODIMENTS

Figure 1:
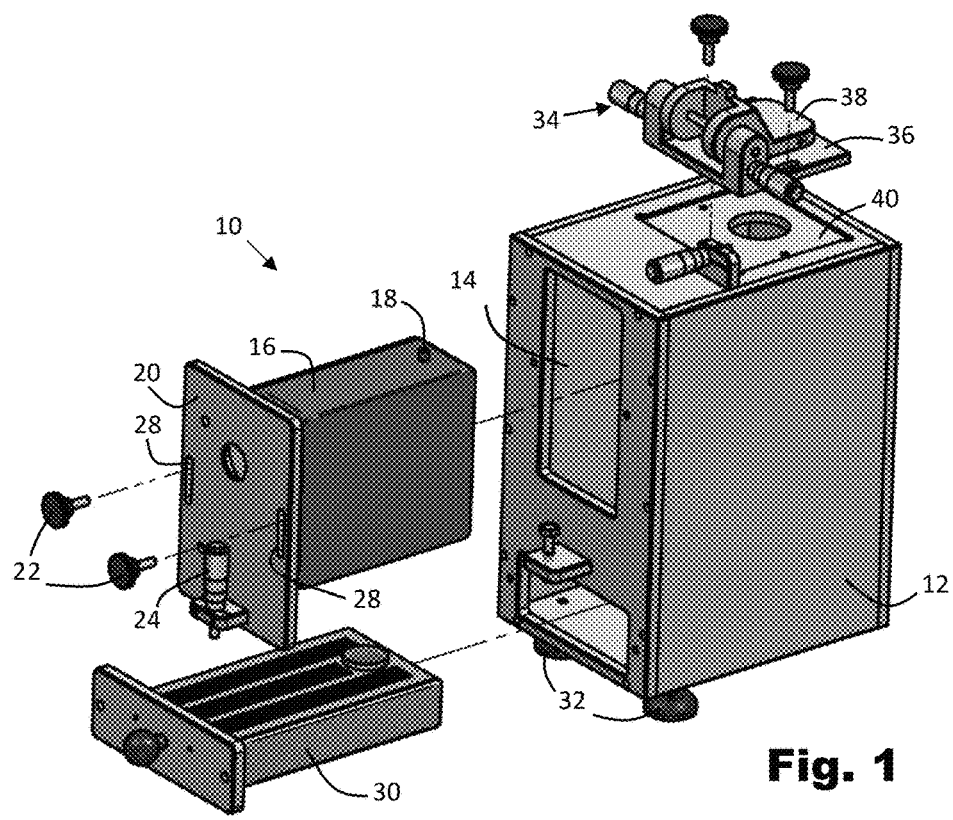
FIG. 1 is a perspective view from a first angle of an apparatus according to the invention.
Figure 2:
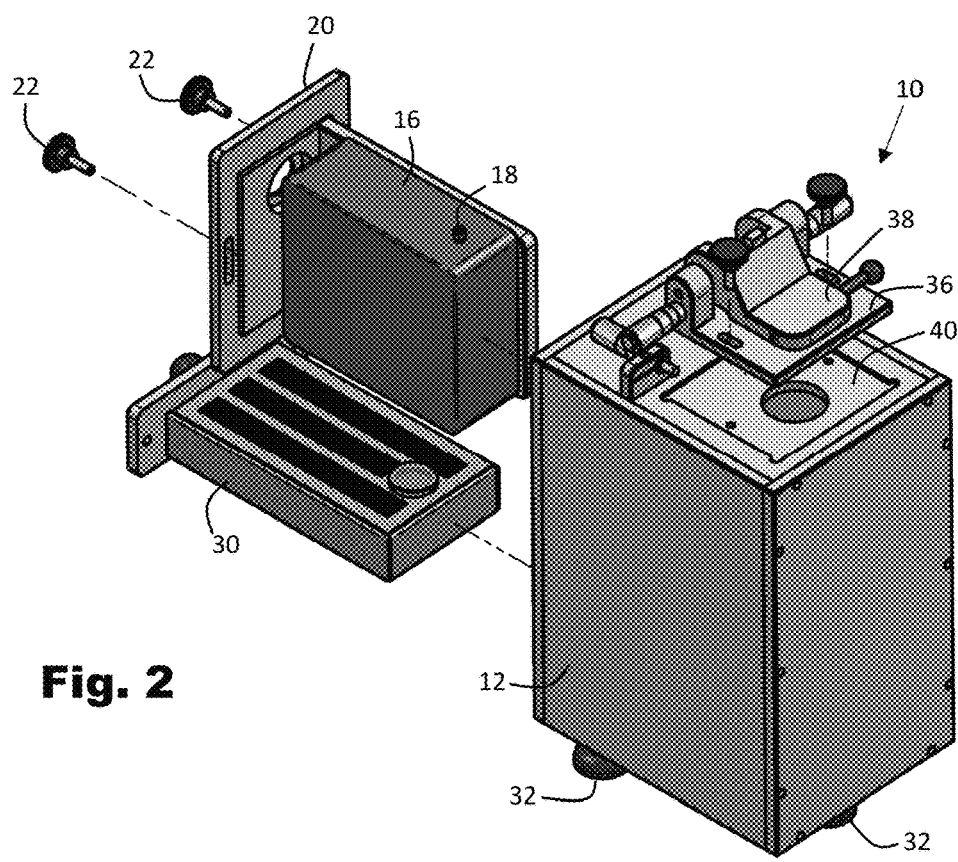
FIG. 2 is a perspective view from a reverse angle of the apparatus of FIG. 1.

In FIGS. 1 and 2, there is indicated, generally at 10, an apparatus for analysing the properties of a liquid sample.

The apparatus 10 comprises an enclosure 12 defining an internal space 14 which receives a spectroscopic assembly 16 having a source and a detector behind an optical port 18.

The spectroscopic assembly 16 is mounted on a cover plate 20 having securing fasteners 22 which secure the cover plate to the housing. The vertical (or Z) position of the cover plate and hence the spectroscopic assembly can be adjusted by a micrometer adjustment mechanism acting against a stop 26 on the housing, with slots 28 in the cover plate accommodating a range of vertical positions.

An evaporation protection tray 30 can be mounted in the housing. When compartments in this tray are filled with a solvent (such as alcohol or water) this acts as a reservoir to ensure that the interior of the housing becomes saturated with vapour, which in turn inhibits evaporation of a small volume sample exposed to the interior of the housing. Adjustable feet 32 permit the apparatus to be accurately levelled.

A sample holder assembly 34 is mounted on top of the housing and comprises a base plate 36 and a hinged cover 38, the base plate being mounted in a recess 40 on the top surface of the housing. The construction of various sample holder assemblies will be described in more detail below.

Figure 3:
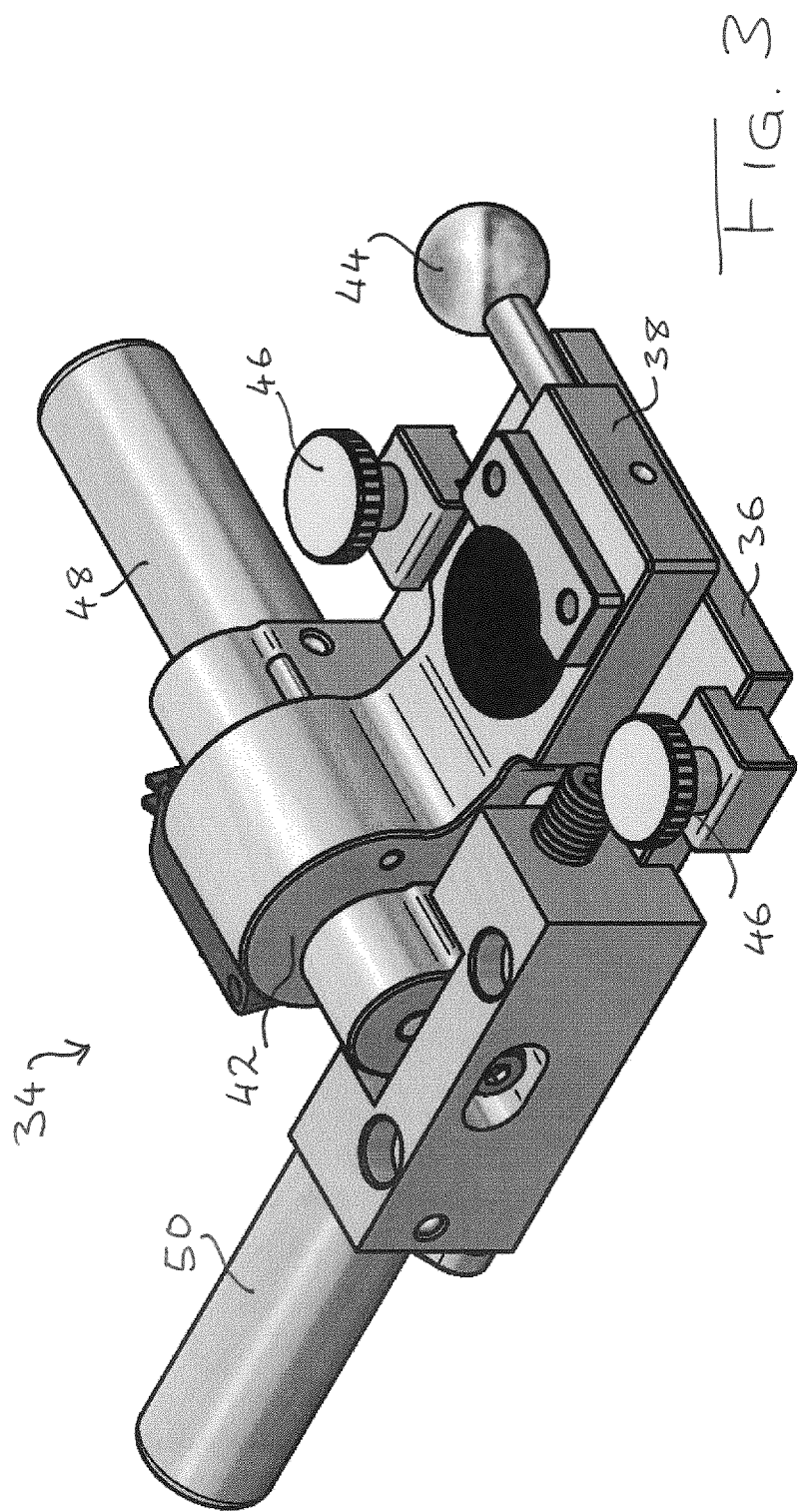
FIG. 3 is a perspective view of a sample holder assembly of an apparatus of the invention.

FIG. 3 shows one embodiment of the sample holder assembly, which has the base plate 36 and cover 38, the cover being mounted on a hinge 42 which allows the cover to be lifted by a handle 44 and flipped backwards to reveal the underside or interior face of the cover and the area of the base plate concealed by the cover. A pair of securing screws 46 are shown in FIG. 3 for securing the base plate to the housing. Also shown are a first micrometer adjuster 48 and second micrometer adjuster 50 which permit fine adjustment of the cover position in X and Y directions relative to the base.

Figure 4:
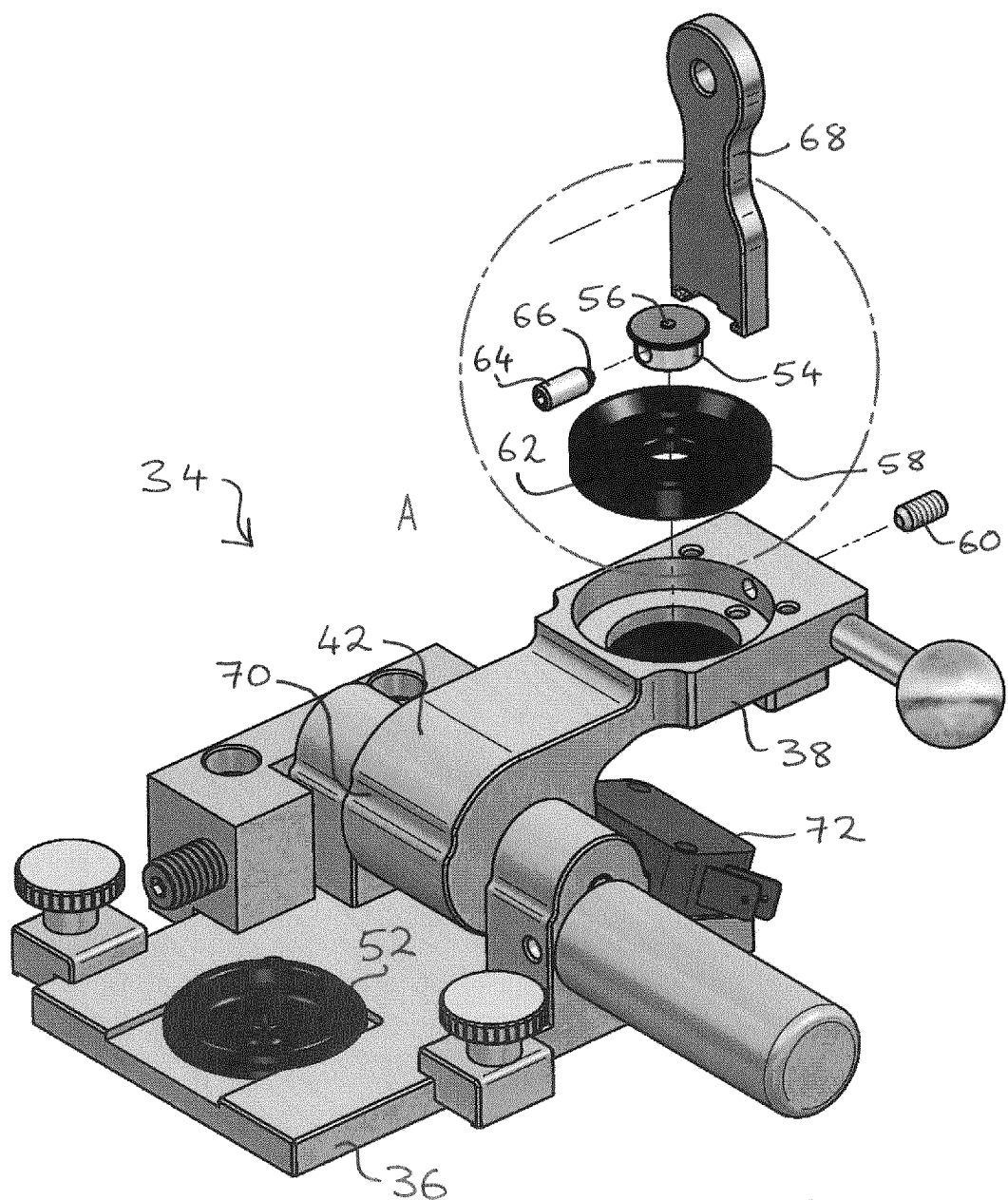
FIG. 4 is a perspective view of the assembly of FIG. 3 with the cover open.
Figure 5:
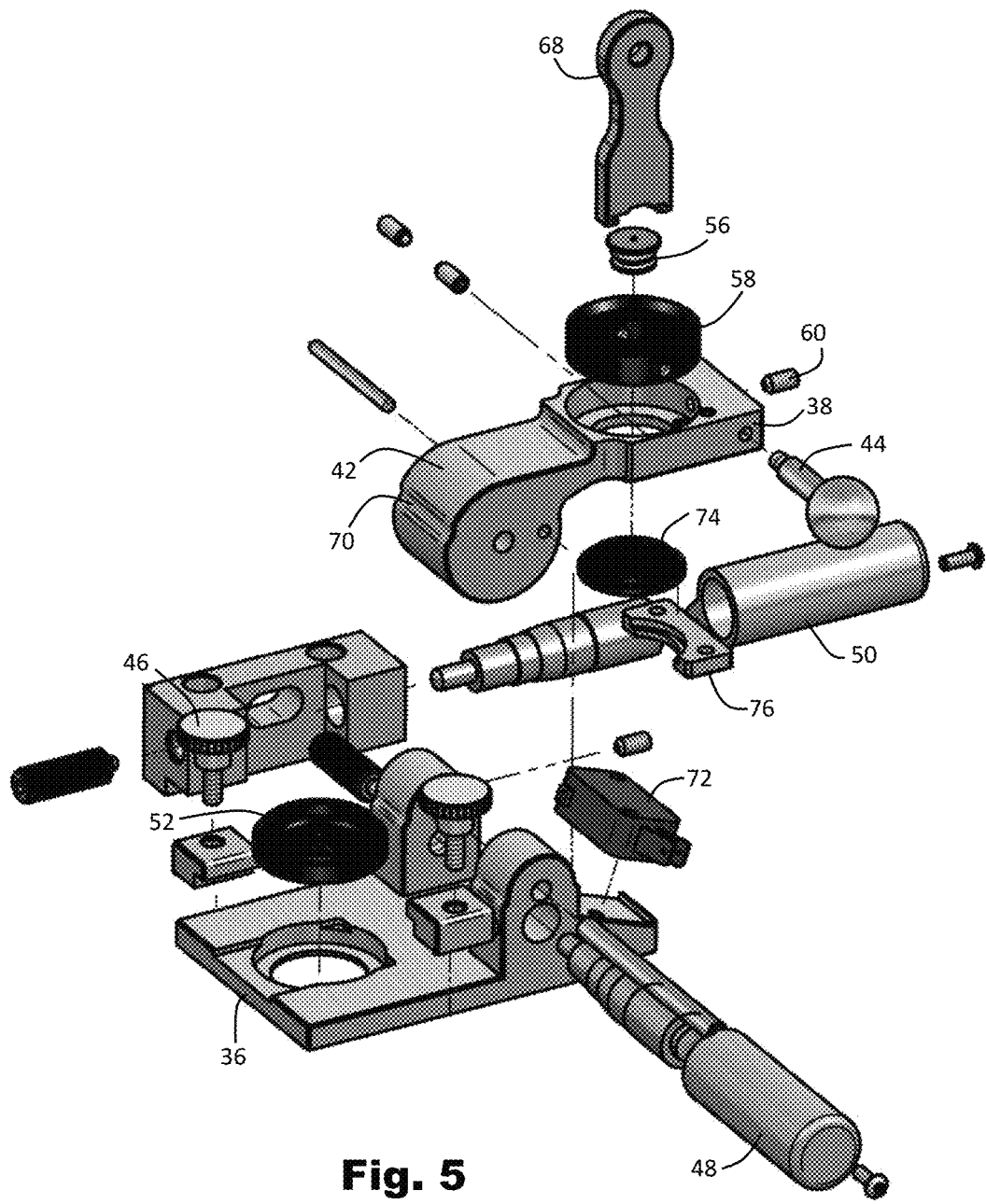
FIG. 5 is an exploded view of the FIG. 3 assembly.

FIG. 4 shows the sample holder assembly of FIG. 3 when the cover 38 has been flipped back through about 180 degrees about the hinge 42. Referring additionally to FIG. 5, this shows the same components, but in exploded view.

It can be seen from FIGS. 4 and 5 that the base plate 36 accommodates a vapour tray 52. The vapour tray may render redundant a large vapour tray in the housing and it serves to provide a small enclosed volume within which a sample will sit when the cover is closed. The vapour tray will be described further below, but it suffices to note that it contains a glass window that exposes the sample to the optical components of the spectroscope.

The sample itself is not shown but FIG. 4 shows the sample holder 54 in exploded view. The sample holder is in the form of a stainless steel body having a raised central disk, platform or plinth 56 which is sized to receive a small volume of sample in the form of a liquid or semi-solid (which term includes gels, pastes and slurries) volume that is sufficiently small to be retained on the plinth by surface tension or Laplace pressure when the plinth is inverted (as when the cover is closed).

The stainless steel sample holder 54 is received in a plinth holder 58 that is mounted in the cover by a grub screw 60. A bore 62 (which is not fully visible in the view of FIG. 4 extends radially through the plinth holder 58 from the external annular surface to the internal annular surface.

A retaining spring member 64 is located in the bore 60 prior to mounting the plinth holder in position in the cover and securing it with the grub screw. The retaining spring member has a cylindrical body with an internal spring-mounted cylinder whose tip 66 extends from the inner end thereof such that in use it protrudes into the central hole of the plinth holder. The inner cylinder can be forced back into the cylindrical body of the retaining spring member 64 against spring pressure, and in this way it serves to accommodate and secure the sample holder 54 in the plinth holder 58.

This permits different sample holders such as sample holder 54 to be swapped into and out of the plinth holder 58 using a custom-designed tool 68 that is adapted to engage the rim of the sample holder without contacting the central plinth or a sample loaded thereon.

It can be seen that the part of the hinge 42 which rotates with and is integral with the cover has a recessed groove or cam surface 70 which registers with a micro switch 72 when the cover is closed. Opening the cover is thereby detected by the micro switch and this is connected to the spectroscope to disable it. When the cover is closed the micro switch detects this and enables the operation of the spectroscope. This is an important safety feature when lasers are used in the spectroscope, and it can also protect sensitive detectors.

Also shown in FIG. 5 are a back cover plate 74 for covering the rear of the plinth holder and a vial holder clamp 76. The back cover plate 74 may be removed, along with the plinth holder 58 and the sample holder 54, and an alternative form of sample holder, such as a vial, to be mounted to the vial holder clamp, in a modified form of operation.

Figure 6:
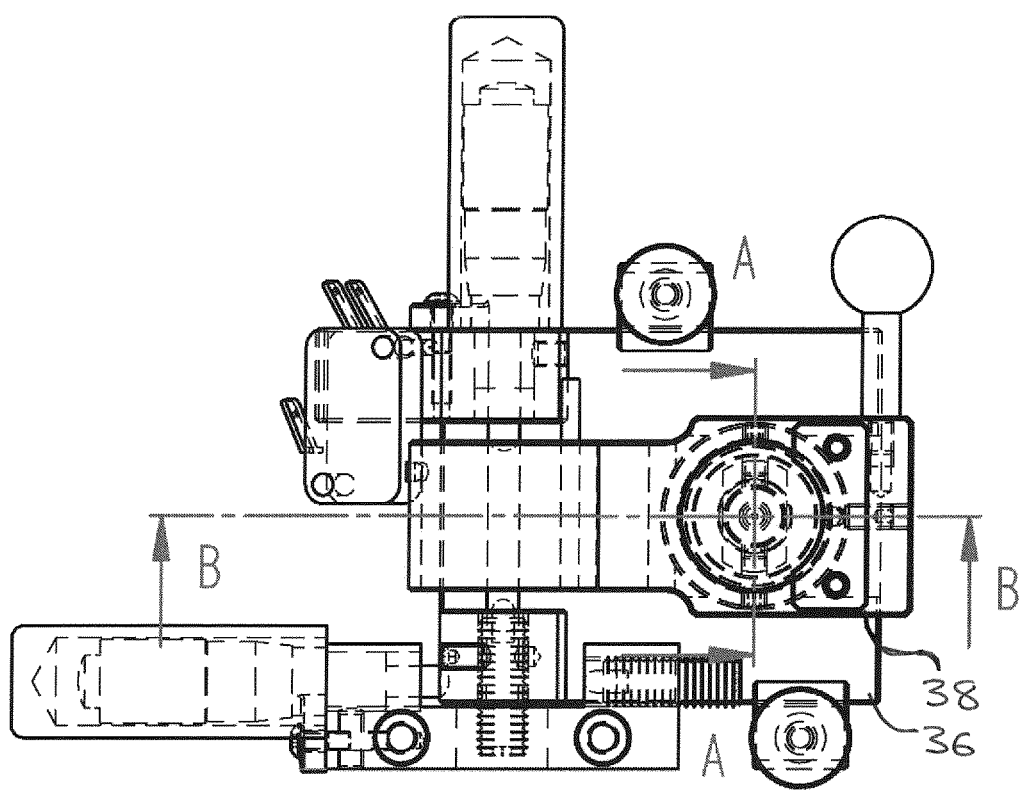
FIG. 6 is a top view of the FIG. 3 assembly.
Figure 7:
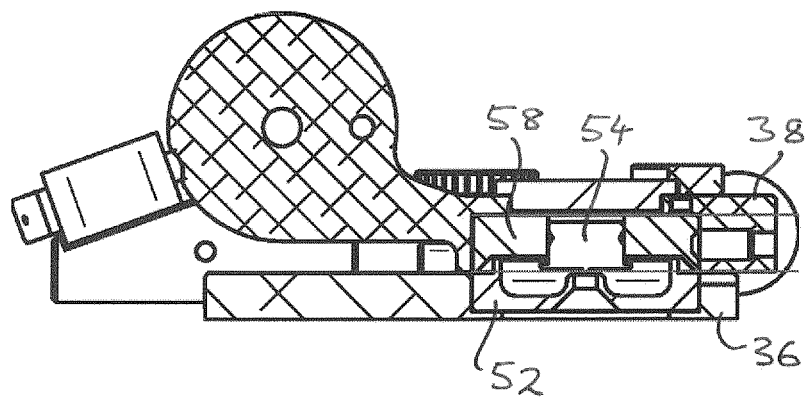
FIG. 7 is a sectional elevation of the FIG. 3 assembly taken along the line B-B in FIG. 6.

FIG. 6 shows a top plan view of the sample holder assembly of FIGS. 3-5 (with internal features shown in broken lines), and FIG. 7 shows the cross-section through FIG. 6 taken along the line B-B.

It can be seen that with the cover 38 in its closed position the plinth holder 58 is brought face-down onto the vapour tray 52.

Figure 8:
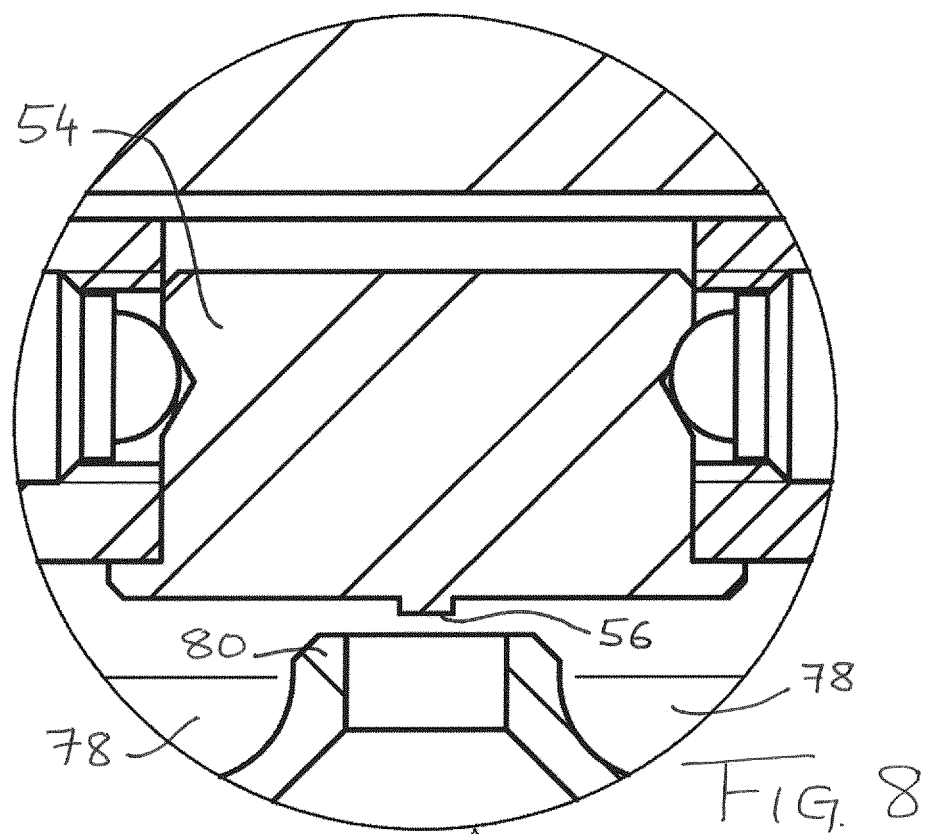
FIG. 8 is an enlarged detail of the sample holder with the cover of the FIG. 3 assembly closed.
Figure 9:
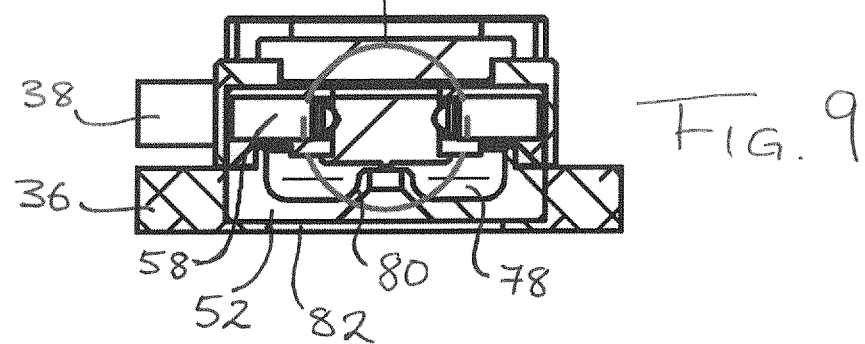

FIGS. 8 and 9 show the detail of this arrangement in enlarged form, with FIG. 8 being a detail of FIG. 9. The vapour tray 52 has an internal annular moat 78 and a raised central cylindrical wall 80 that defines the internal wall of the moat 78. The moat can be filled with a solvent (such as the solvent used in a droplet of sample (not shown) positioned and retained on the central plinth 56), and this promotes a saturated atmosphere to inhibit evaporation of the droplet in the very small confined volume between the cover and the vapour tray when the cover is closed.

The plinth is positioned centrally over the cylindrical wall 80, which in turn is aligned vertically with the optical port of the spectroscope, allowing light to illuminate the sample and for light from the sample (e.g. reflected, refracted or emitted radiation) to be collected. The underside of the vapour tray is separated from the rest of the interior of the housing by a transparent (e.g. quartz glass) disc 82 to maintain separation of the atmospheres while maintaining optical continuity. It will be appreciated that such a cover need only be transparent to wavelengths of interest, which may vary according to the type of analysis being conducted and the wavelengths used (e.g. infrared, visible or ultraviolet spectroscopy, Raman spectroscopy or fluoroscopic measurements). A sample located on the plinth, in this way, is brought to a predefined sample locus where measurements can be taken reliably and accurately using the source and detector which are also in predetermined positions.

FIGS. 10A-10C show an alternative form of sample holder 54'. As with the holder shown in FIGS. 4-9, a central raised plinth 56 is provided to receive a sample thereon. Also as in the earlier embodiment, a rim 84 extends peripherally from the top surface 86 and this allows engagement of the sample holder by the tool 68 (FIG. 4). Unlike the sample holder seen in FIG. 4, however, the sample holder 54' of FIGS. 10-12 has a circumferential V-shaped recess 88 around its cylindrical surface. This recess can engage with the retaining spring member 64 of FIG. 4 regardless of the rotation of the sample holder when it is inserted into the plinth holder. In contrast the sample holder 54 of FIG. 4 can be seen to have a specific recess positioned on its cylindrical surface, requiring it to be inserted with the correct orientation to be properly retained.

While the sample holders thus far described are machined from a single piece of stainless steel, alternative materials can be used. In particular, quartz and ceramic holders are very suitable. Such holders can be made entirely from an alternative material, or for example a quartz or ceramic rod having the diameter of the plinth only may be embedded centrally in a larger sample holder body made from any suitable material (such as metal, glass or plastic).

Figure 11:
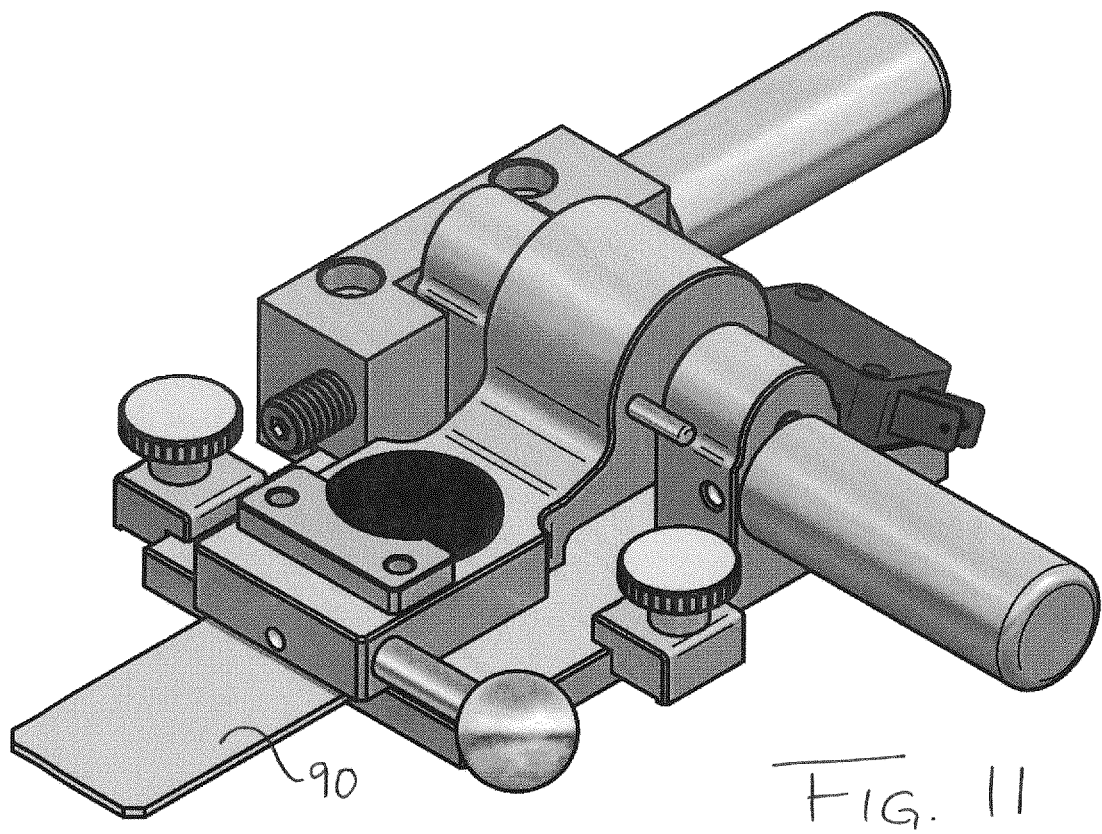
FIG. 11 is a perspective view of the sample holder assembly of FIG. 3 with a SERS plate in place of the sample holder.
Figure 12:
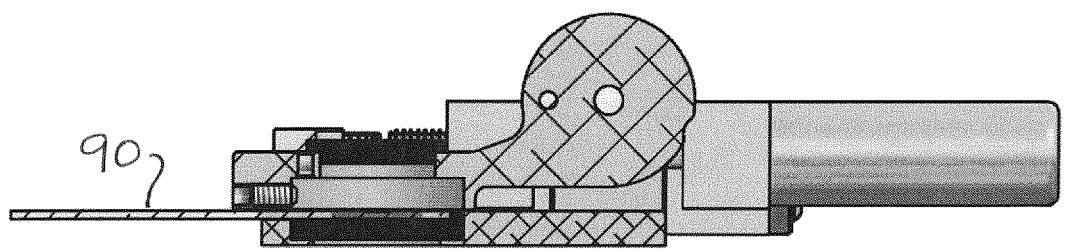
FIG. 12 is a sectional elevation through the assembly of FIG. 11.
Figure 13:
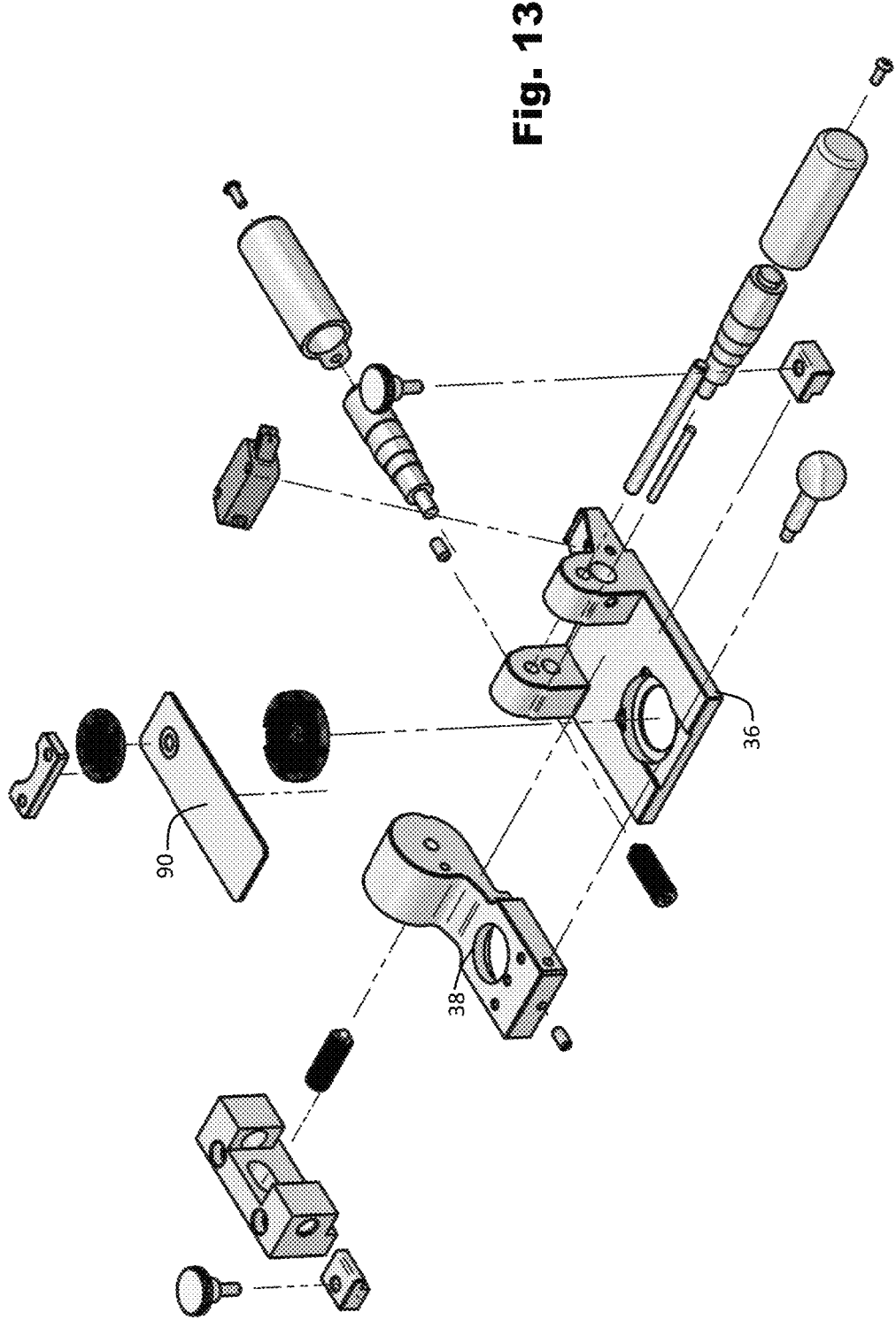
FIG. 13 is an exploded view of the assembly of FIG. 11.

The provision of the sample holder (whether of FIGS. 4-9 or of FIGS. 10A-10C or any alternative version) on the internal surface of the cover, and the flipping motion of the cover whereby it can be moved in a hinged manner between closed and opened positions, provides significant advantages. It enables small (microliter-sized) droplets and samples to be accurately and easily positioned on a very small target area with the target area exposed and fully accessible FIGS. 11-13 shows an embodiment similar to that of FIGS. 4-9 in the operation and movement of the cover, but in which the sample holder is a SERS plate 90 carried by the cover instead of the sample holder 54 or 54'. SERS (or surface enhanced Raman spectroscopy) is a technique that enhances Raman scattering by molecules adsorbed on rough metal surfaces or customised nanostructures. The enhancement factor can be as much as $10^{10}$ to $10^{11}$, which opens up the possibility of single molecule detection.

SERS arose out of the observation that a roughening of the surface the molecules are adsorbed on helps enhance the Raman process, which in fact has proven to be a result of enhancement of the local electromagnetic field close to the roughened surface due to the excitation of a localized surface plasmon, and chemical mechanisms giving rise to further enhancement for molecules adsorbed onto specific sites (hot-spots) where the resonant charge transfer occurs. The resulting enhancements occur most commonly when the excitation laser frequency coincides with a localized surface Plasmon resonance (LSPR) of a plasmonic-active material such as Au, Ag and Cu, over normal Raman scattering, making it a very powerful technique for sensing, as it also offers label-free detection of biomolecules in their natural environment. In the study of biological species, SERS is often coupled with resonance Raman by using a laser excitation wavelength in resonance with the molecular electronic levels (SERRS).

The complexity of SERS, particularly in relation to sample preparation—that may also factor in the SERS background—is a current bottleneck to realisation of its full potential. SERS has been shown to be capable of single molecule detection with high specificity, but single-molecule sensitivity in diluted solution is a challenge which limits its application, particularly in forensics and healthcare diagnostics, where for example, early warning focuses on small concentrations of biomarkers in biofluids such as blood. SERS depends on the statistical binding of analytes to the SERS hot-spots where the electromagnetic field is particularly intense. The creation of such hot-spots is a highly-active area of research in the field, with various approaches to nanofabrication being taken, including top-down lithography-based fabrication, and bottom-up wet chemistry of structures on surfaces. In the liquid phase, molecules can be dispersed far away from the surface, making an encounter of the molecules with hot-spots statistically unlikely. Approaches to overcoming this problem include the introduction of plasmonic nanoparticles into the solution, functionalisation of nanoparticles with 'grabby' bioreceptors in the case of biomolecules, the use of microfluidic channels, nanoporous membranes, super-hydrophobic surfaces and external—both electrical and optical—stimuli to guide and concentrate the molecules towards the fabricated hot-spots. Some approaches use a combination of techniques to increase the possibility of an analyte interaction with a hot-spot.

The plate 90 is prepared in advance with a suitable surface treatment, such as gold or silver nanoparticle colloidal preparations. The sample is positioned on the SERS surface, and measurements are taken of the surface enhanced Raman spectrum. In an alternative modification, the SERS plate can be mounted on the base plate when the cover is opened to reveal the base plate. A raster scanning mechanism can be provided to move the illumination spot from a laser in the spectroscope (whether by physically moving the laser, or the spectroscope assembly, or by optically scanning the position from a fixed laser in known manner). In this way the return signal can be detected to determine a maximum when the illumination spot is targeted to a point of maximum SERS activity on the SERS plate, and this can be used as a pre-calibration step.

Figure 14:
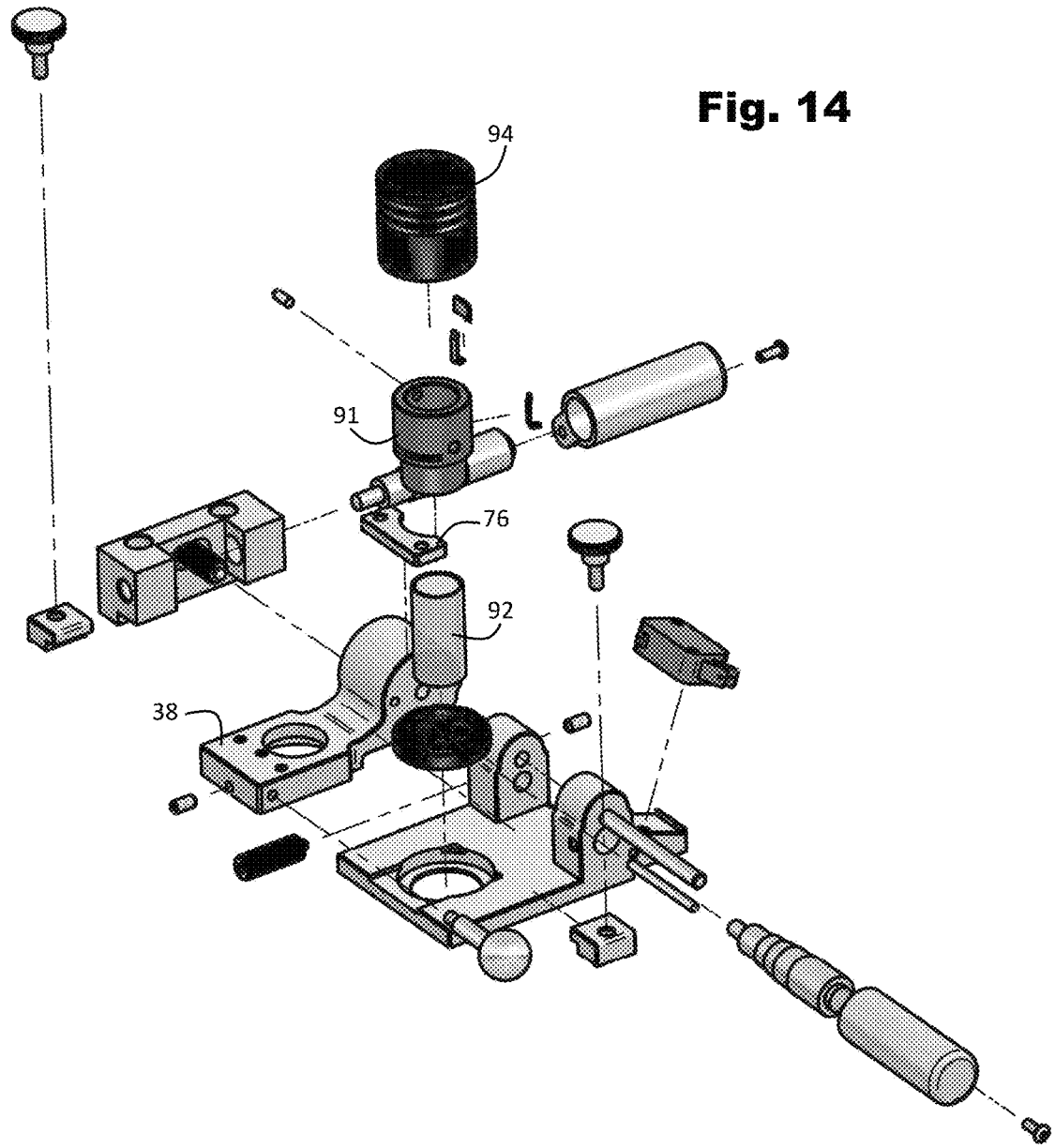
FIG. 14 is an exploded view of an alternative configuration of sample holder assembly with a vial holder in place of the sample holder.

FIG. 14 shows a modification to the embodiment of FIGS. 3-9, in which the sample holder 54, plinth holder 58 and back cover 74 have been removed and in their place a vial holder 91 has been mounted, using the vial holder clamp 76, to the outside of the cover 38, with a sample-containing vial 92 exposed to the interior of the cover. A protective cap 94 is provided on the exterior of the vial holder 91. This modification adapts the instrument for measurement of samples in vials rather than in the form of droplets or small samples on a sample-receiving surface.

Figure 15:
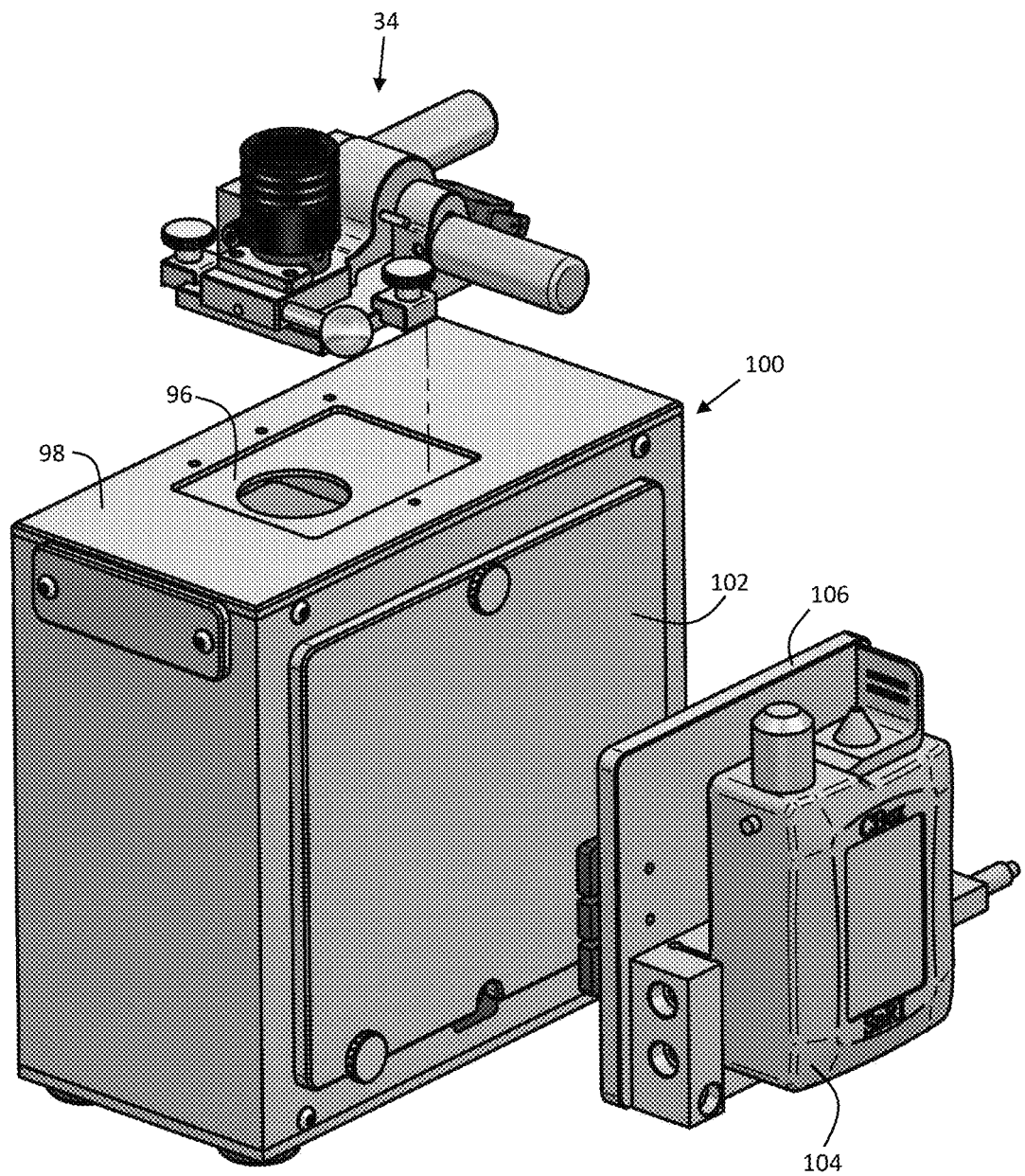
FIG. 15 is a perspective view of an alternative apparatus prior to mounting the sample holder assembly and the spectroscopic assembly.
Figure 16:
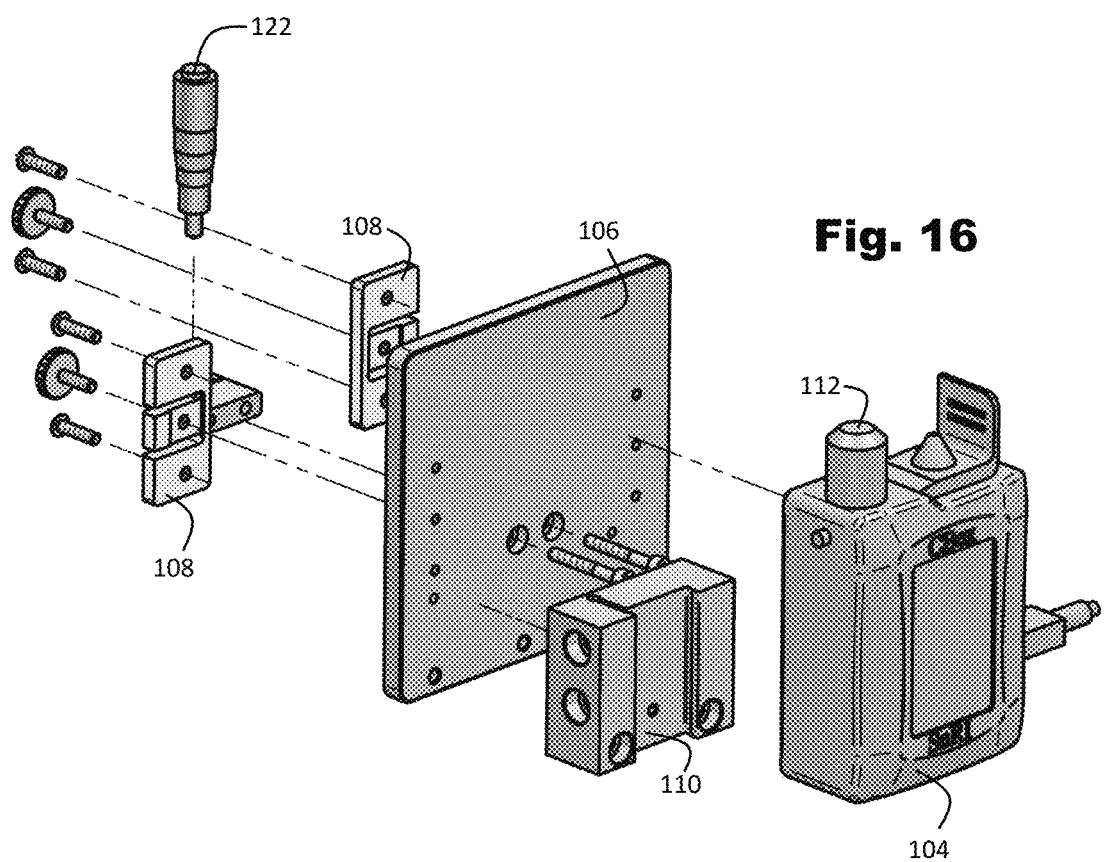
FIG. 16 is an exploded view of a first spectroscopic assembly.

FIG. 15 shows an alternative embodiment of apparatus from FIG. 1, with the sample holder assembly 34 of FIG. 14 ready to be mounted in place. It will be appreciated that this is the same overall sample holder assembly as in FIGS. 3-9 in terms of its construction, base plate and cover, and only the vial holder differentiates it from the FIGS. 3-9 embodiment. The sample holder assembly 34 is mounted in place onto a recess 96 on the top surface 98 of a housing 100. A removable access plate 102 enables a user to access the interior for removal and replacement of a spectroscopic assembly 104 (shown outside the housing). As in FIGS. 1 and 2, this assembly 104 is mounted on a mounting plate 106 which can be fixed into position within the housing with brackets 108 (FIG. 16) and thereby correctly position the assembly 104 relative to the sample locus. A spacer 110 adapts the position of a particular spectroscopic assembly to the mounting plate 106, and it will be appreciated that different instruments can thereby be substituted into the correct position.

The spectroscopic assembly pictured is a CBEx handheld Raman spectrometer (produced by Snowy Range Instruments of Laramie, Wyo.) which provides a spectral range of 400 to 2300 cm-1 from a 70 mW laser through an optical port 112, with the ability to perform raster scanning. Any other suitable spectroscopic instrument can be used.

Figure 17:
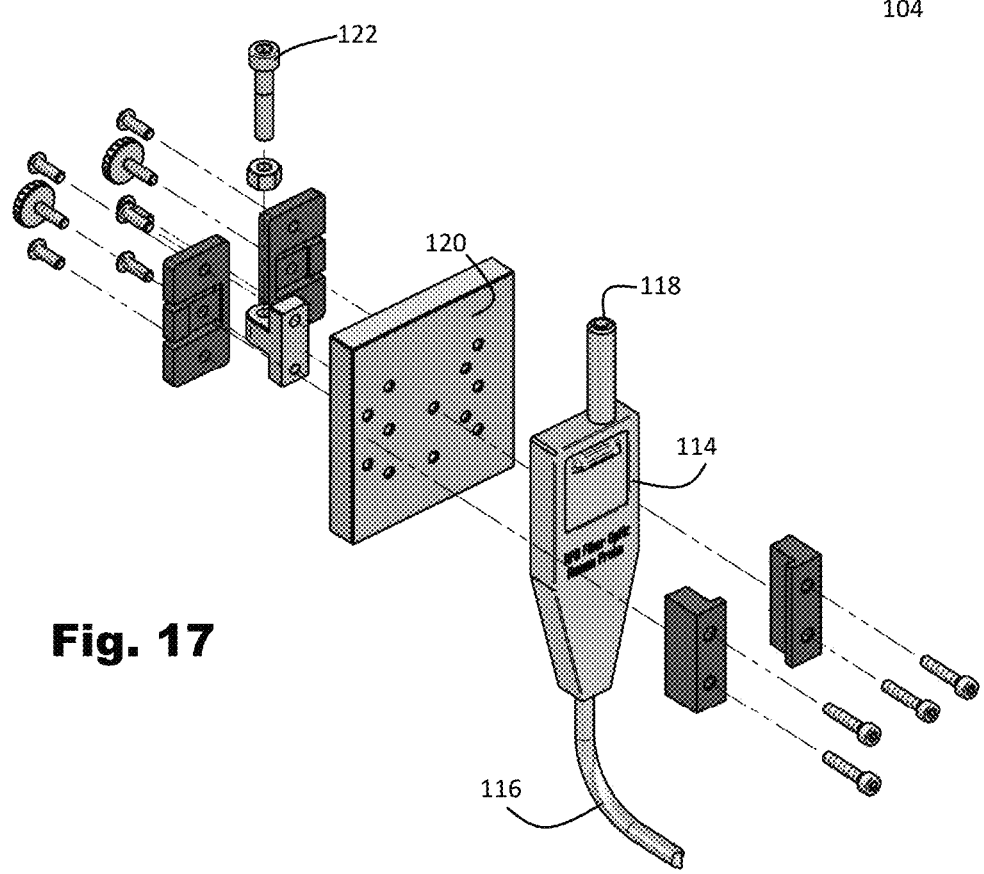
FIG. 17 is an exploded view of a second spectroscopic assembly.

FIG. 17 shows a fibre optic Raman probe 114 which is connected by fibre optic cable 116 to an external spectroscope (not shown), the optical signals being emitted and received by an optical port 118 which acts as source and detector. As with the embodiment of FIG. 16, the probe 114 is mounted on a plate 120 which is mountable within the housing 100 of the FIG. 15 apparatus. Both the FIG. 16 and FIG. 17 embodiments have a micrometer adjustment mechanism 122 for varying the vertical Z position of the spectroscopic assembly relative to the housing.

The above embodiments describe a free-space optics implementation, where the source is remote from the sample, and light is transmitted to the sample from the source and from the sample to the detector within the apparatus.

Figure 18:
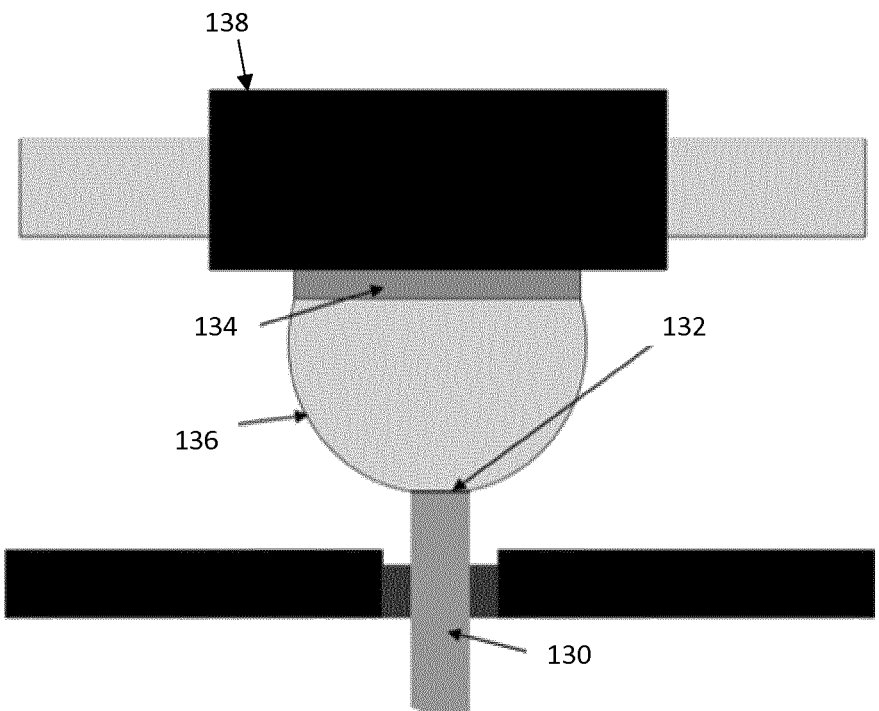
FIG. 18 is a detail of a further embodiment.

FIG. 18 shows a detail of an alternative embodiment, in which the source and detector (not shown) are each coupled to an optical fiber 130, which terminates at a terminal surface 132. The terminal surface 132 is positioned relative to the sample-receiving surface 134 (shown when the cover 138 is closed) such that the sample 136 makes contact with the terminal surface 132. The contact may be with the surface of the sample as shown or the terminal surface may be positioned such that it is immersed in the sample.

The arrangement couples the light directly into and out of the sample. The terminal surface 132 may be treated with a surface treatment that provides an enhanced response, such as a nanostructured coating or treatment that provides a SERS response. The terminal surface or some other part of the optical fiber that is immersed in the sample may be coated with a reagent or active agent that causes a chemical reaction or a biological response, enabling the sample to be analysed by generating such a reaction or response and analysing a spectroscopic characteristic of the resultant species.

FIG. 18 shows the terminal surface as integral with the optical fiber. The terminal surface may alternatively be provided on an end member or cap that is placed on the optical fiber and is transparent to a frequency of interest. This permits the cap to be easily swapped in and out, which may be advantageous to enable different responses and reactions to be studied, or to avoid cross-contamination between samples.

Figure 19:
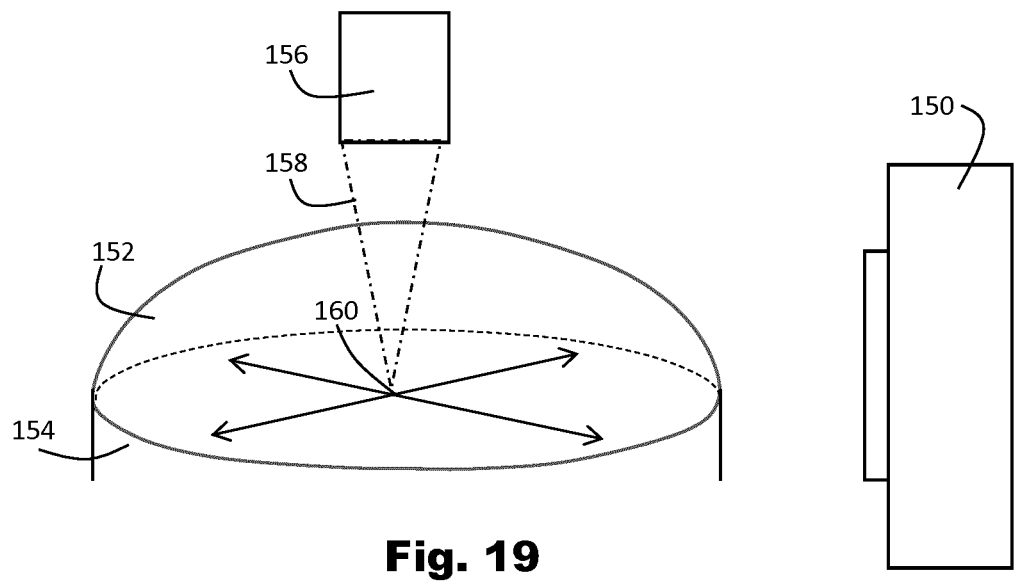
FIG. 19 is a schematic illustration of a scanning technique for obtaining multiple measurements from a sample.

FIG. 19 shows a schematic illustration of a scanning capability that may be incorporated in the apparatuses described herein. A camera 150 is positioned to image a sample 152 (in this case a droplet) positioned on the sample-receiving surface of a plinth 154. It will be appreciated that the sample is shown sitting on top of the surface but in the embodiments described above this arrangement is typically inverted so that the droplet hangs upside down from the sample-receiving surface when the cover is in the closed position. Light 158 from a source 156 is focussed (by the optical properties of the source and the refractive properties of the droplet) to a point 160 on the surface where the droplet sits.

By translating the sample-receiving surface in two dimensions, e.g. using an x- and y-raster scanning mechanism, the detected signal may be integrated across the surface, or a search may be performed for an optimum signal position. In the case of SERS measurements, where the response may increase by several orders of magnitude at points where the excitation frequency coincides with a localized surface Plasmon resonance (LSPR) of a plasmonic-active material such as Au, Ag and Cu, there may be localized hot spots that provide greatly increased signal strength.

Accordingly, the surface may be translated through a scanning pattern of any suitable design (for example an x-y raster pattern, an orbital pattern or any other suitable pattern), to identify areas of increased response, using feedback from the detector. This is preferably done as a coarse search, followed by a fine scan in one or more areas of particularly increased signal strength.

Thus, in an automated fashion, an initial planar raster scan of the plinth surface is undertaken at the drop base centre, out to the drop edge. The software monitors and stores the Raman spectrum at each x, y position, and that with maximum intensity Raman signal is identified for the scan area.

The obtained Raman spectra can be used individually, integrated or averaged over the full drop layer.

The camera image is provided to a controller which sets the scan parameters, by extracting from the image the boundaries of the surface, to assist in ensuring that the scan covers the desired area. As an alternative, the camera could be omitted and the boundaries could be programmed into the system or detected by the detector (e.g. a sharp drop-off of signal at the edge of the droplet).

Figure 20:
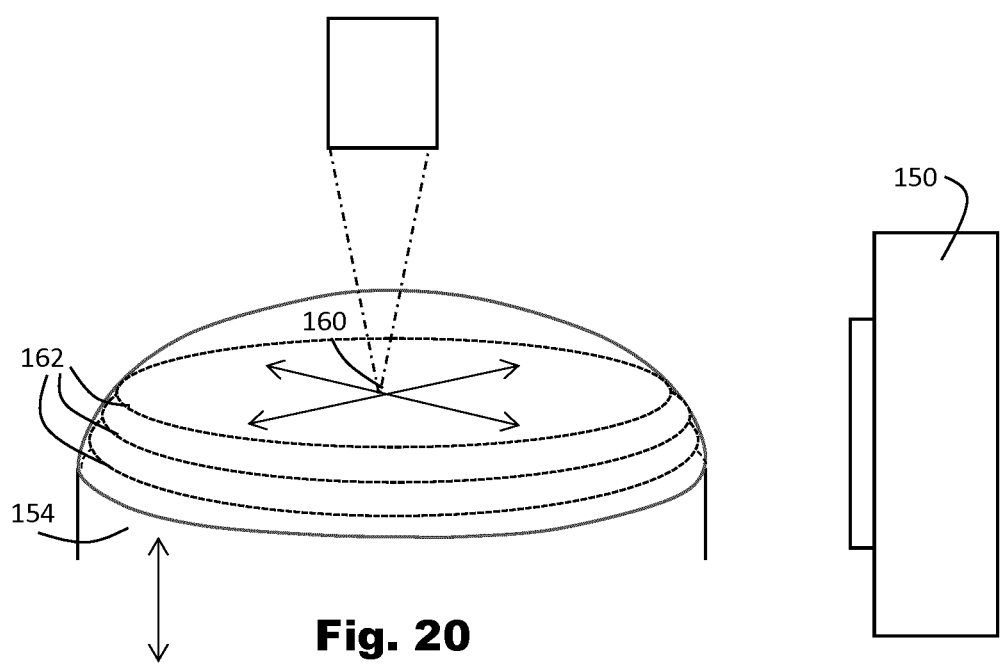
FIG. 20 is a schematic illustration of a further scanning technique for obtaining multiple measurements from a sample.

FIG. 20 shows a schematic illustration of a three-dimensional scanning arrangement in which the same parts are denoted by the same reference numerals as in FIG. 19. In addition to motor controllers or manual controls that enable translation of the sample-receiving surface in the x-y plane as in FIG. 19, the sample-receiving surface may also be translated in the orthogonal z-direction. (Alternatively, the source or source optics could be translated to move the focal point 160 relative to the sample-receiving surface of the plinth 154.

As indicated by the "slices" 162, the volume of the sample may be scanned completely by performing scans across the sample volume in planar regions separated by a small z-distance. Thus, a planar scan can be taken along the plinth surface, out to the edges of the drop. The procedure is repeated at fixed Z-offset distances, out to the upper edge of the drop; a z-axis motor offsets the z-axis position of the plinth (or of the source or source optics to translate the focal point to a new z-position), and the plinth is scanned in the next x-y plane a fixed distance offset in z, within the drop volume limits.

The skilled person will appreciate that with x-, y- and z-controls, alternative scanning modalities are also enabled, such as scanning vertical slices (e.g. x-z plane or y-z plane) and then translating the plinth laterally to shift the plane where the slices are scanned, or in any other suitable scan pattern. Using the embodiment of FIG. 20, the apparatus may provide measurements from any point on the sample-receiving surface, or any point within the droplet volume bulk, or on the exposed droplet surface, as well as in the atmosphere surrounding the droplet. This can be used to determine areas of signal maximum, or to integrate the signal across the droplet, or to analyse the surface or surrounding atmosphere, depending on the analytical goal.

Thus, the stored Raman spectra that have been taken at each point (or predetermined points assigned in software, for example, spectrum with maximum intensity Raman signal per scan layer) in each planar scan can be integrated or averaged into one Raman spectra for the drop volume.

The camera is again optional but a preferred addition to the apparatus, in order to determine the extent of the droplet volume. Image recognition software can extract the position of the droplet surface and this can be translated to co-ordinates defining the boundaries of the scan (noting that the scan may extend outside the droplet in cases where analysis of gaseous components from the droplet are of interest). The use of a camera also enables the droplet volume to be calculated which may assist in other calculations, such as in determining refractive index, surface tension, and so on.

Figure 21:
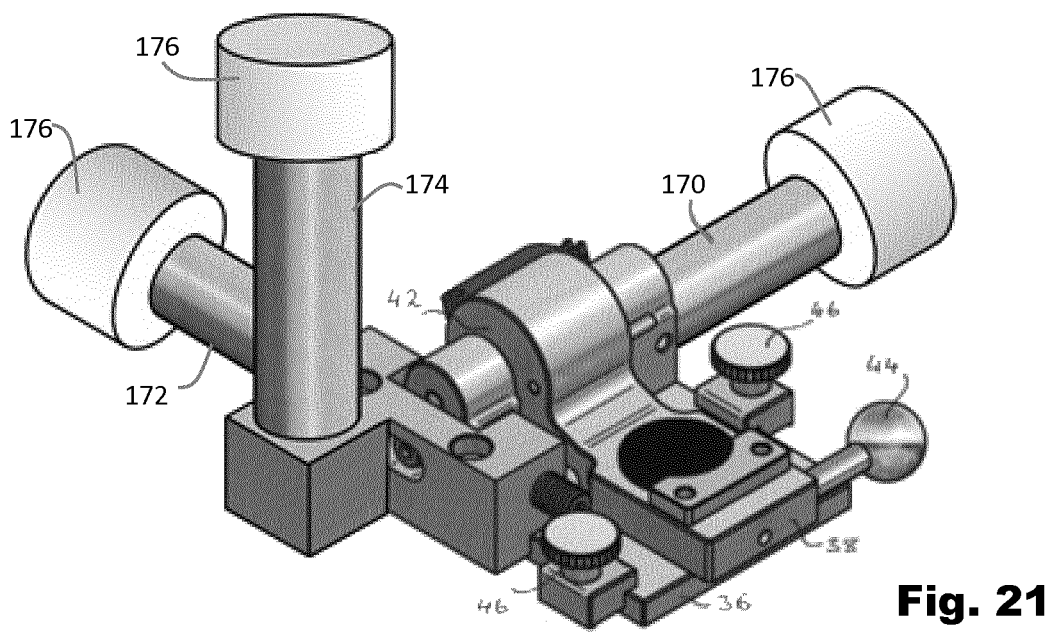
FIG. 21 is an embodiment adapted to perform scanning techniques such as are shown in FIGS. 19 and 20.

FIG. 21 illustrates one embodiment for realising the scanning functionality described in relation to FIGS. 19 and 20. The embodiment of FIG. 21 is identical to that of FIG. 3 with the exception of the specifically identified changes now discussed. In place of the micrometer adjuster mechanisms 48 and 50 of the FIG. 3 embodiment, x-y adjustments are enabled by a first motorised actuator 170 allows for an x-direction translation of the flipping mechanism as a whole, a second motorised actuator 172 enables translation in the y-direction, and a third motorised actuator 174 enables translation in the z-direction. Each actuator is driven by a respective motor 176, with the motors under the common control of a motor controller (not shown) which may translate the entire cover mechanism and therefore the sample-supporting surface to any position within the limits of travel defined by the three actuators. Motor controller software may thus realise the scanning functionality described above, outputting appropriate control signals to the individual motors.

The third motorised actuator may be omitted if z-scanning functionality is not required in simpler apparatuses. Alternatively, it may be provided on the optical components to scan the focal point of the incident light relative to the sample-supporting surface. However, it is preferred to include a z-motor on the optical components or the cover/sample-supporting surface in order to increase the utility of the apparatus, permit better focussing (or defocussing where desired) and enable volumetric scanning.

The motors 176 in this embodiment (which is an example, and which the skilled person may vary according to design needs by using different motors and mechanisms) are stepper motors with 2045 steps per revolution, driving the actuators via M3×0.5 (ISO standard) threaded rods. Thus, a resolution of 244 nm per step is achieved. If such a resolution is not needed, then for example a stepper motor with 200 steps per revolution could be used, giving a resolution of 2.5 µm per step. The travel of each actuator is a minimum of 10 mm, so that a scan volume of 10 mm×10 mm×10 mm is achieved, enabling any part of a sample located in such a volume to be analysed.

Each stepper motor is driven by a respective stepper motor PCB. A pair of micro switches (not shown) detect end position of travel of the cover assembly. A Raspberry Pi single board computer provides control signal outputs to the PCBs, according to programmed control instructions which may receive as inputs the image from the camera (if present) and from the detector. Thus, the program control may hunt for a signal maximum in a predefined scan pattern or it may perform a full-surface 2D scan or a full-volume 3D scan according to the needs of the user.

The skilled person will readily appreciate that alternative control systems may be provided.

As an alternative to stepper motors, linear motors could be employed, or piezometric inertial-slider (slip-stick) motor stages that can be actuated individually or together by application of a periodic exponential voltage to the piezo-electric elements on respective x-, y- and z-stages.

Figure 22:
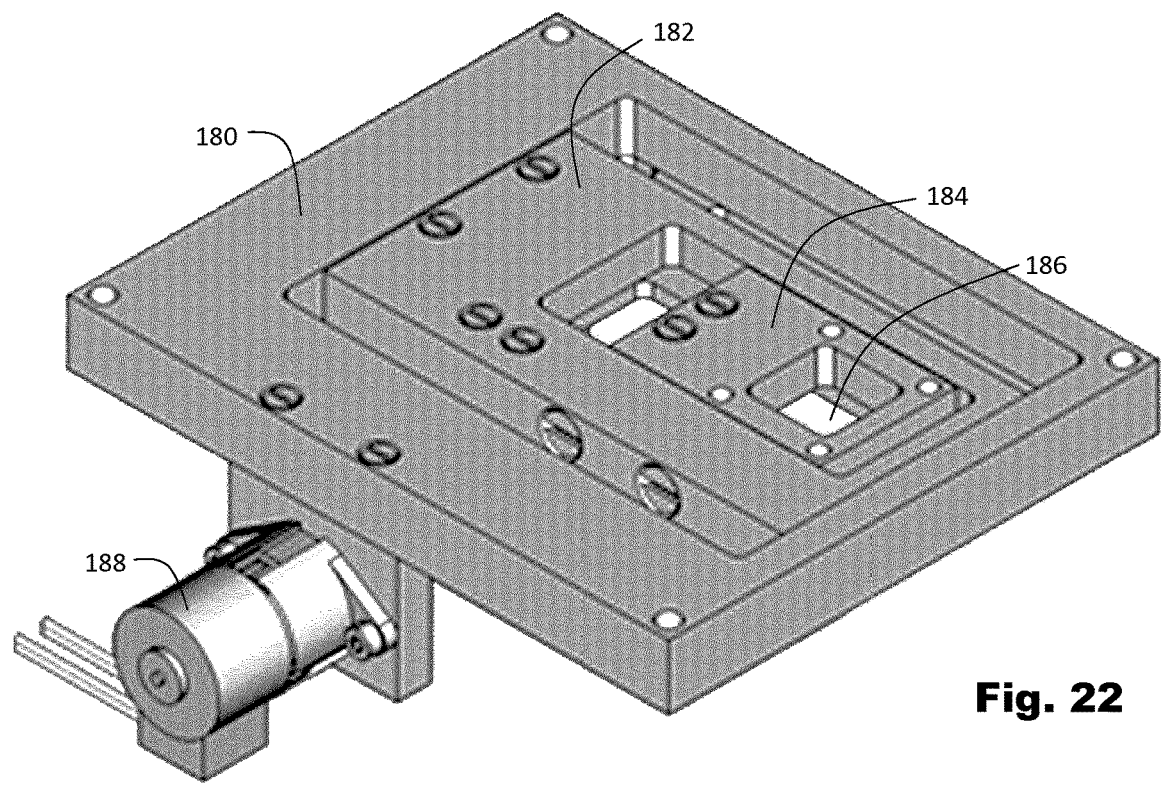
FIG. 22 is a view from above of a mechanism for translating a cover assembly.
Figure 23:
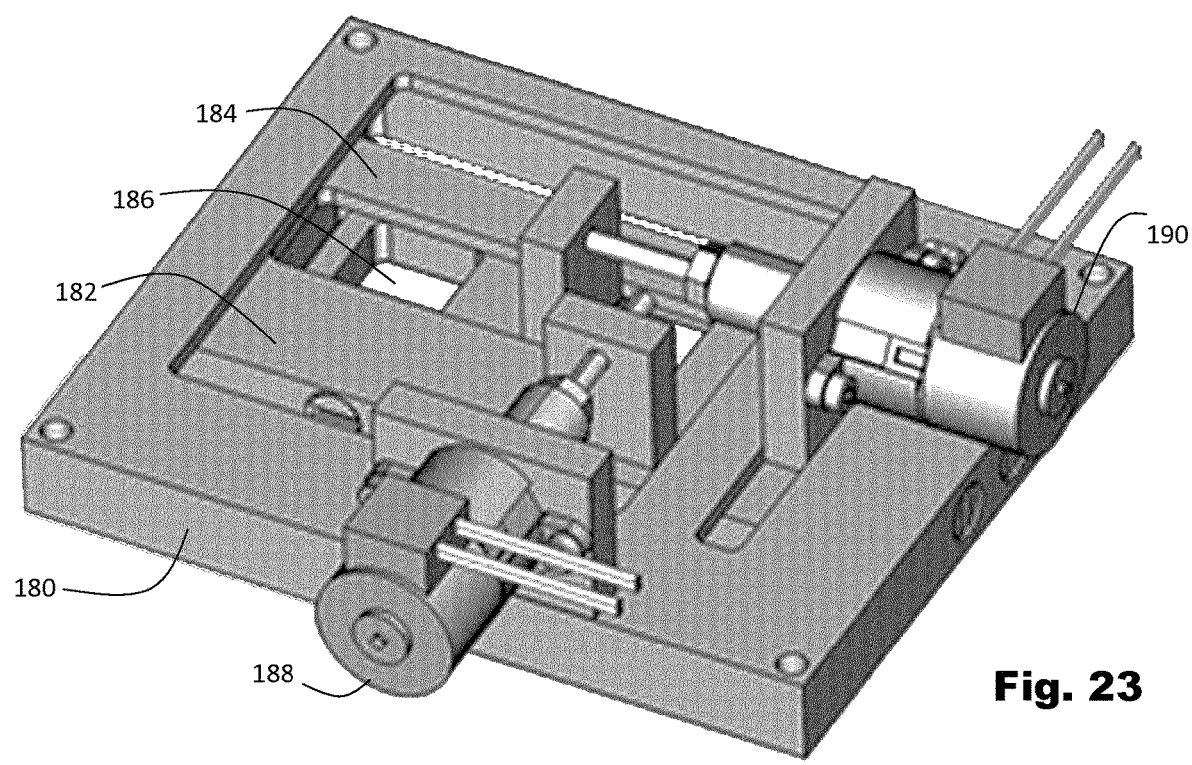
FIG. 23 is a view from below of the FIG. 22 mechanism.

An exemplary mechanism for enabling the cover assembly to be translated is illustrated in FIGS. 22 and 23. FIG. 22 shows the mechanism from above and FIG. 23 from below. In FIG. 22 there can be seen an outer frame 180 which is mounted to the housing of an apparatus (not shown). A first slider 182 is slidably mounted within the frame, and a second slider 184 is slidably mounted within the first slider 182. The flipping cover mechanism (not shown) is secured to the second slider 184, such that the sample-receiving surface locates within an aperture 186 in the second slider when the cover is in the closed position.

Referring to FIG. 23, a first stepper motor 188 is mounted on the frame 180 and is connected to the first slider 182 so as to permit the controlled translation of the first slider relative to the frame. A second stepper motor 190 is mounted on the first slider 182 and is connected to the second slider 184 to permit the controlled translation of the second slider relative to the first slider. By appropriate control of the first and second stepper motors, the second slider 184 (and the flipping cover assembly mounted thereon) can be translated in the x- and y-directions relative to the frame (and hence the apparatus housing and the source and detector carried therein).

While FIGS. 22 and 23 do not show a z-motor, the skilled person will appreciate that the mechanism of FIGS. 22 and 23 may be provided with a z-axis motor to enable the translation thereof in the z-direction. Alternatively, the source or appropriate optical components may be provided with z-axis controls in a straightforward manner to permit the relative translation of a focal point relative to the sample in the z-direction, and realisation of the volumetric scanning abilities discussed herein.

In some cases, there will be an advantage in providing a mechanism to calibrate the movement of the x-y-z motors to ensure traceability of sample measurements. For example, in the pharmaceutical industry, "pill profiling" is important to the pharmaceutical industry. Many pills are formulated to include a coating, which may be added for a variety of reasons, such as taste masking, controlled or delayed release or dissolution, acid resistance in the stomach, and so on. For these reasons accurate control of coating thickness is important. Determining how the constituent ingredients of a pharmaceutical formulation are distributed, arranged in layers, blended, and so on, is a crucial part of the formulation process and of the analysis of formulations.

The apparatuses of the invention enable samples to be analysed in a three-dimensional context, using the stepper motors to vary the point of analysis. However, for quality control purposes, it may be important to have the measurement position calibrated.

Calibration can be enabled by providing a reference plinth manufactured using lithography e.g. from silicon with accurately manufactured features in the x-y plane for calibrating using the spectral maximum of the Raman signal from this substrate to calibrate the x-y motion of the stepper. Providing stepped features in this calibration plinth allows one to calibrate the z motion. There are numerous materials that could be used to fabricate such a plinth. Interferometrically polished quartz with evaporated Raman coatings are one example, though other methods of manufacture could be used to produce such a component to calibrate the stepper. The use of slip gauges could be developed to provide a quick calibration of the z-drive movement increasing confidence in measurements mad using such apparatuses.

Figure 24:
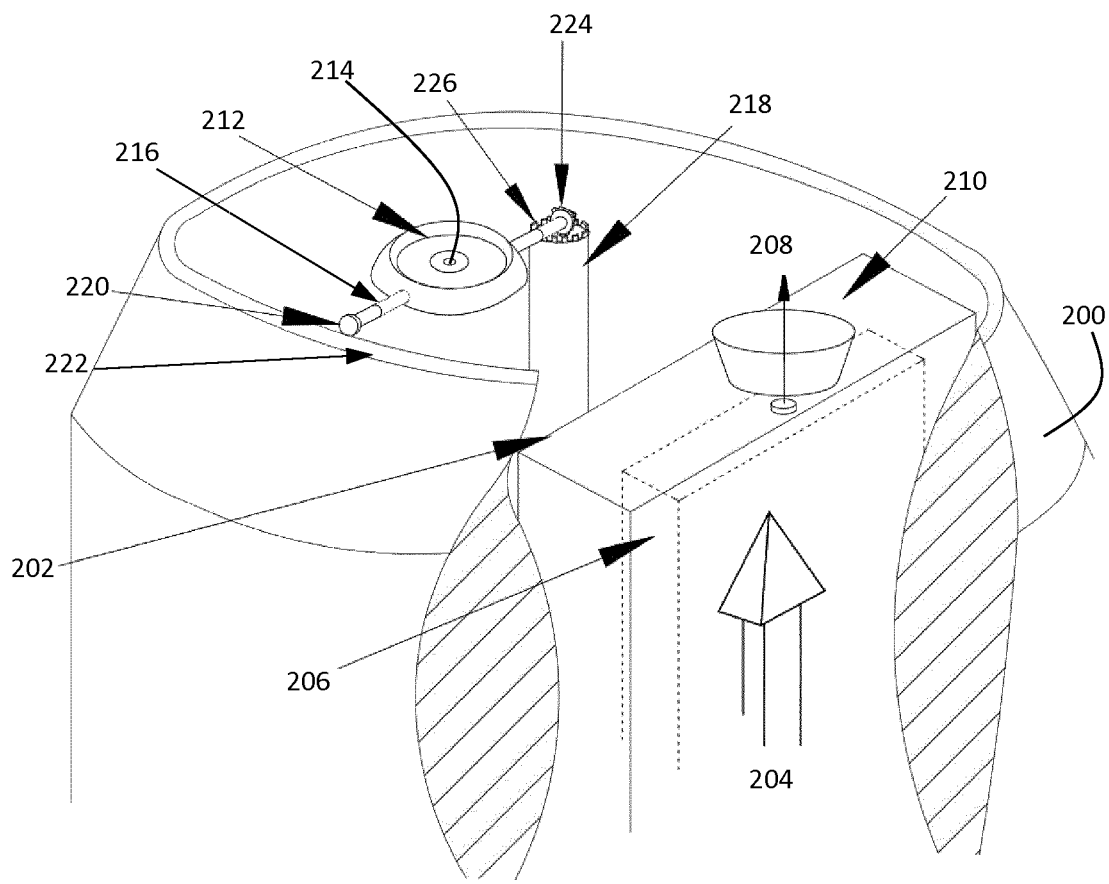
FIG. 24 is a sectional schematic view of a further apparatus with a different mechanism for bringing a sample into position for measurement.

FIG. 24 is a sectional schematic view of a further apparatus, employing an alternative mechanism to bring the sample in position to the flipping cover of earlier embodiments.

The apparatus of FIG. 24 comprises a housing 200 shown in cut-away form, within which a spectrometer assembly 202 (which may be of any suitable type and configuration, including replaceable or built-in) is mounted. The spectrometer assembly is capable of translation within the housing from a first (lower) position to a second (higher) position as indicated by arrow 204. The assembly 202 houses a spectrometer having a source and a detector (not shown) and emits light 208 into an environmental chamber body member 210 mounted on top of the spectrometer assembly 202.

A carrier 212 has a plinth removably mounted thereon to provide a sample-receiving surface 214, which is similar to previous embodiments. The carrier is rotatable on a spindle 216 about an axis passing through the carrier. The spindle is mounted at one end on a centre post 218 in the housing and on the other end by a roller 220 carried on a circular track 222 (albeit not appearing as truly circular in the drawing). Rotation of the carrier is achieved by a screw drive 224 and screw thread 226 at the top of the centre post 218. When the carrier is rotated the outer end travels around the circular track 222, and the carrier body itself spins about the axis of the spindle.

A sample may be loaded on the carrier's sample-receiving surface 214, with the spectroscopic assembly 202 in the lowered position. The carrier may then be rotated until it is in position with the sample-receiving surface facing downward and positioned over the environmental chamber body member 210. The environmental chamber body member is then raised, and it makes a seal with the inverted carrier, so that the sample-receiving surface is enclosed and is exposed to the illumination from the source within the thus-formed environmental chamber.

Figure 25:
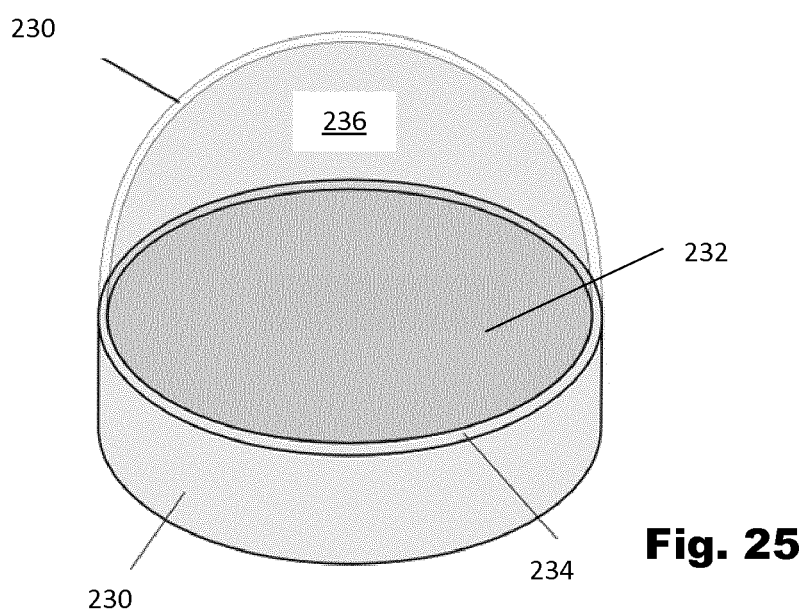
FIG. 25 is a perspective view of a sample holder (plinth).

FIG. 25 is a perspective view of a sample holder (also called a drophead or plinth) 230, which has a circular drop-supporting surface divided into a major inner hydrophilic area 232 and a narrow annular hydrophobic band 234.

An aqueous droplet 236 is positioned on the sample-receiving surface and is confined to the hydrophilic area. The droplet has an outer coating 238 of an oily composition which is immiscible with water and prevents evaporation, or may be used to study surface or interface phenomena and reactions. The boundary of the droplet is precisely pinned to the hydrophilic/hydrophobic boundary.

Alternatively, the droplet coating 238 and droplet body 236 may be a partially immiscible combination; this enable the study of the dissolution and diffusion of the cap liquid into the droplet, and can provide valuable information about one or both liquids and their interaction.

There exist commercial pipetting technologies and perhaps the simplest of these developments pipettes two phases of liquid. Such dual pipetting is useful for the analysis of medical fluids where these can be pipetted onto the plinth in one operation. The second immiscible liquid would produce a volume of sample trapped inside a cap of oil and this provides a sealed sample volume that does not evaporate and in which reaction kinetics can be studied in the bulk of the droplet, or at the oil-medial fluid interface. Such a sealed capped droplet sample could of course be produced by first pipetting a sample and then using a smaller pipette to deliver the oil, lipid solution or other hydrophobic liquid phase. It is possible of course to implement this embodiment as the converse with inner hydrophobic liquid on a hydrophobic area capped with a water solution that rests on a hydrophilic outer ring. There are a growing number of microfluidic systems that can be adapted to deliver such complex drop samples.

The invention claimed is:

1. An apparatus for analyzing the optical properties of a sample, comprising:
    a housing to receive a light source and a detector in predetermined positions;
    a sample locus defined relative to said housing and positioned such that when a light source and a detector are in said predetermined positions, the sample locus is subject to illumination by said light source and the detector is positioned to receive and detect light from the sample;
    a cover on the housing, the cover being movable in a hinged manner between an open position and a closed position, the cover having an internal face which encloses the sample locus when the cover is in the closed position;

a sample-receiving surface for receiving a free-standing sample in liquid or semi-solid form, the sample-receiving surface being disposed on the internal face of the cover such that when the cover is in said open position the sample-receiving surface is exposed to and accessible by a user in a generally horizontal orientation for loading of a sample thereon; and wherein when the cover is moved to said closed position it encloses said sample locus, with the sample-receiving surface being tilted away from the horizontal during said closing movement and the sample being retained thereon by surface tension or adhesion and brought to said sample locus in an enclosed environment.

2. The apparatus of claim 1, wherein the sample-receiving surface is removable permitting its replacement by an alternative sample-receiving surface, or by a conventional sample holder into the position normally occupied by the sample-receiving surface.

3. The apparatus of claim 2, wherein the sample holder is located in use within a hole in the cover, and when the sample holder is removed, the hole can be accessed from an external cover surface to permit the insertion of an alternative sample holder from a rear side thereof.

4. The apparatus of claim 1, wherein the sample-receiving surface is translated through at least 90 degrees as the cover moves from the open position to the closed position.

5. The apparatus of claim 4, wherein the sample-receiving surface is translated through approximately 180 degrees as the cover moves from the open position to the closed position, with the sample-receiving surface being inverted when the cover is closed.

6. The apparatus of claim 1, wherein the housing further comprises a support for receiving a spectroscopic assembly comprising a source and a detector mounted on a spectroscopic assembly housing, such that when said assembly is received by said support, the source and detector are in said predetermined positions.

7. The apparatus of claim 1, wherein the source is coupled to an optical fiber terminating at a terminating surface through which light is coupled from the source to the sample locus, the terminating surface being positioned such that when the cover is in a closed position, the sample is brought into contact with the terminating surface.

8. The apparatus of claim 1, wherein the detector is coupled to an optical fiber terminating at a terminating surface through which light is coupled from the sample locus to the detector, the terminating surface being positioned such that when the cover is in a closed position, the sample is brought into contact with the terminating surface.

9. The apparatus of claim 7, wherein the terminating surface is provided on an end member carried on the end of said optical fiber, the end member being transmissive to light of a frequency useful for spectroscopy.

10. The apparatus of claim 7, wherein both the source and the detector are coupled to the same optical fiber having a single terminating surface which couples light into and out of the sample.

11. The apparatus of claim 7, wherein said terminating surface carries active material thereon which enhances a spectral response.

12. The apparatus of claim 7, wherein the terminating surface is provided with a nanostructured treatment suitable to provide a surface enhanced Raman spectroscopy (SERS) response.

13. The apparatus of claim 1, wherein an internal space comprises a sample chamber which is enclosed when the cover is in the closed position and which contains the sample locus, and an instrumentation chamber which receives the source and detector, the sample chamber being separated from the instrumentation chamber by an impermeable wall having a wall section which is transparent to a wavelength of radiation emitted by the source.

14. The apparatus of claim 13, wherein the sample chamber is sealed when the cover is closed, and is sufficiently small in enclosed volume as to inhibit evaporation of a liquid sample droplet on said sample-receiving surface.

15. The apparatus of claim 13, wherein the sample chamber comprises a reservoir for liquid whereby the enclosed volume becomes saturated with vapor from said liquid when said cover is closed.

16. The apparatus of claim 1, further comprising a sensor adapted to detect when the cover reaches a predetermined position moving between the open and closed positions, the sensor being operatively connected to a control circuit which prevents the source from being activated while the cover is open.

17. The apparatus of claim 1, further comprising one or more motors operable to displace the sample-receiving surface, when the cover is in the closed position, relative to the source and detector, thereby permitting fine adjustment of material carried on the sample-receiving surface relative to the sample locus.

18. The apparatus of claim 17, further comprising a motor controller operatively connected to said one or more motors, the motor controller being operable to scan the sample-receiving surface in a controlled manner relative to the sample locus.

19. The apparatus of claim 1, further comprising first and second motors which are disposed to displace the sample-receiving surface in mutually orthogonal directions in a plane of the sample-receiving surface.

20. The apparatus of claim 19, further comprising a third motor disposed to displace the sample-receiving surface in a direction normal to the plane of the sample-receiving surface.

21. The apparatus of claim 17, further comprising at least one additional motor operable to displace the source or an optical element through which the light travels from the source to the sample locus, wherein the additional motor is operable to translate a focus of light from the source in a direction normal to a plane of the sample-receiving surface.

22. The apparatus of claim 1, further comprising an optical sensing system to identify boundaries of the sample.

23. The apparatus of claim 22, further comprising a motor controller operatively connected to one or more motors, the motor controller being operable to scan the sample-receiving surface in a controlled manner relative to the sample locus, wherein said motor controller is programmed to perform a scan within the boundaries identified by the optical sensing system.

* * * * *